United States Patent
Khan et al.

(10) Patent No.: US 7,516,320 B2
(45) Date of Patent: Apr. 7, 2009

(54) DISTRIBUTED PROCESSING ARCHITECTURE WITH SCALABLE PROCESSING LAYERS

(75) Inventors: Shoab Ahmad Khan, Rawalpindi (PK); Muhammad Mohsin Rahmatullah, Islamabad (PK)

(73) Assignee: Quartics, Inc., Irvine, CA (US)

( * ) Notice: Subject to any disclaimer, the term of this patent is extended or adjusted under 35 U.S.C. 154(b) by 103 days.

(21) Appl. No.: 11/390,558

(22) Filed: Mar. 27, 2006

(65) Prior Publication Data

US 2006/0287742 A1 Dec. 21, 2006

(51) Int. Cl.
*H04L 9/00* (2006.01)

(52) U.S. Cl. .................. 713/153; 713/160; 719/321; 700/90; 718/101

(58) Field of Classification Search ........... 719/321; 700/90; 713/153, 160; 718/1, 101, 102, 718/107
See application file for complete search history.

(56) References Cited

U.S. PATENT DOCUMENTS

| | | | |
|---|---|---|---|
| 4,914,692 A | | 4/1990 | Hartwell et al. |
| 5,142,677 A | * | 8/1992 | Ehlig et al. ............. 718/108 |
| 5,189,500 A | * | 2/1993 | Kusunoki ............... 349/17 |
| 5,200,564 A | * | 4/1993 | Usami et al. ........... 84/602 |
| 5,341,507 A | * | 8/1994 | Terada et al. ........... 712/18 |
| 5,363,404 A | | 11/1994 | Kotzin et al. |
| 5,492,857 A | * | 2/1996 | Reedy et al. ........... 438/407 |
| 5,594,784 A | | 1/1997 | Velius |
| 5,663,570 A | * | 9/1997 | Reedy et al. ........... 257/9 |
| 5,678,021 A | * | 10/1997 | Pawate et al. ........... 711/104 |
| 5,724,356 A | * | 3/1998 | Parameswaran Nair et al. ............ 370/401 |
| 5,848,290 A | * | 12/1998 | Yoshida et al. ........... 712/26 |
| 5,860,019 A | * | 1/1999 | Yumoto .................. 712/26 |
| 5,861,336 A | * | 1/1999 | Reedy et al. ............. 438/407 |
| 5,872,991 A | * | 2/1999 | Okamoto et al. .......... 712/26 |
| 5,883,396 A | | 3/1999 | Reedy et al. |
| 5,915,123 A | | 6/1999 | Mirsky et al. |
| 5,923,761 A | | 7/1999 | Lodenius |
| 5,941,958 A | * | 8/1999 | Hwangbo ................. 709/250 |
| 5,956,517 A | * | 9/1999 | Okamoto et al. ........... 712/1 |
| 5,956,518 A | | 9/1999 | Dehon et al. |
| 5,991,308 A | | 11/1999 | Fuhrmann et al. |
| 5,999,525 A | | 12/1999 | Krishnaswamy et al. |
| 6,047,372 A | | 4/2000 | Thayer et al. |
| 6,052,756 A | * | 4/2000 | Barnaby et al. .......... 711/105 |
| 6,057,555 A | | 5/2000 | Reedy et al. |
| 6,067,595 A | * | 5/2000 | Lindenstruth ............ 710/307 |

(Continued)

OTHER PUBLICATIONS

Juárez et al., A VLSI Architecture for MPEG-4 Stream Processing and Communication, Packet Video 2000, IEEE.*

(Continued)

*Primary Examiner*—Nasser G Moazzami
*Assistant Examiner*—David Garcia Cervetti
(74) *Attorney, Agent, or Firm*—Patentmetrix

(57) ABSTRACT

The present invention is a system on chip having a scalable, distributed processing architecture and memory capabilities through a plurality of parallel processing layers. In one embodiment, the processor comprises a plurality of processing layers, a processing layer controller, and a central direct memory access controller. The processing layer controller manages the scheduling of tasks and distribution of processing tasks to each processing layer. Within each processing layer, a plurality of pipelined processing units (Pus), specially designed for conducting a defined set of processing tasks, are in communication with program memories and data memories.

10 Claims, 25 Drawing Sheets

U.S. PATENT DOCUMENTS

| | | | |
|---|---|---|---|
| 6,075,788 A * | 6/2000 | Vogel | 370/395.51 |
| 6,108,760 A | 8/2000 | Mirsky et al. | |
| 6,122,719 A | 9/2000 | Mirsky et al. | |
| 6,134,578 A * | 10/2000 | Ehlig et al. | 718/100 |
| 6,154,446 A * | 11/2000 | Kadambi et al. | 370/239 |
| 6,226,266 B1 | 5/2001 | Galand et al. | |
| 6,226,735 B1 | 5/2001 | Mirsky | |
| 6,269,435 B1 | 7/2001 | Dally et al. | |
| 6,304,551 B1 | 10/2001 | Ramamurthy et al. | |
| 6,331,977 B1 * | 12/2001 | Spaderna et al. | 370/360 |
| 6,349,098 B1 * | 2/2002 | Parruck et al. | 370/395.6 |
| 6,483,043 B1 * | 11/2002 | Kline | 174/262 |
| 6,504,785 B1 * | 1/2003 | Rao | 365/230.05 |
| 6,519,259 B1 | 2/2003 | Baker et al. | |
| 6,522,688 B1 * | 2/2003 | Dowling | 375/222 |
| 6,573,905 B1 | 6/2003 | MacInnis et al. | |
| 6,574,217 B1 * | 6/2003 | Lewis et al. | 370/352 |
| 6,580,727 B1 | 6/2003 | Yim et al. | |
| 6,580,793 B1 | 6/2003 | Dunn et al. | |
| 6,597,689 B1 * | 7/2003 | Chiu et al. | 370/354 |
| 6,628,658 B1 * | 9/2003 | Mariggis | 370/395.1 |
| 6,631,130 B1 | 10/2003 | Roy et al. | |
| 6,631,135 B1 | 10/2003 | Wojcik | |
| 6,636,515 B1 | 10/2003 | Roy et al. | |
| 6,640,239 B1 | 10/2003 | Gidwani | |
| 6,649,428 B2 * | 11/2003 | Kai | 438/14 |
| 6,650,649 B1 | 11/2003 | Muhammad et al. | |
| 6,661,422 B1 | 12/2003 | Valmiki et al. | |
| 6,668,308 B2 * | 12/2003 | Barroso et al. | 711/141 |
| 6,669,782 B1 * | 12/2003 | Thakur | 118/715 |
| 6,697,345 B1 | 2/2004 | Corrigan et al. | |
| 6,707,821 B1 | 3/2004 | Shaffer et al. | |
| 6,728,209 B2 | 4/2004 | Pate et al. | |
| 6,737,743 B2 * | 5/2004 | Urakawa | 257/724 |
| 6,738,358 B2 * | 5/2004 | Bist et al. | 370/289 |
| 6,738,868 B2 * | 5/2004 | Gharachorloo et al. | 711/141 |
| 6,747,977 B1 | 6/2004 | Smith et al. | |
| 6,751,224 B1 * | 6/2004 | Parruck et al. | 370/395.6 |
| 6,751,233 B1 * | 6/2004 | Hann | 370/466 |
| 6,751,723 B1 * | 6/2004 | Kundu et al. | 712/36 |
| 6,754,804 B1 | 6/2004 | Hudepohl et al. | |
| 6,763,018 B1 | 7/2004 | Puthiyandyil et al. | |
| 6,768,774 B1 | 7/2004 | MacInnis et al. | |
| 6,795,396 B1 * | 9/2004 | Parchak et al. | 370/230.1 |
| 6,798,420 B1 | 9/2004 | Xie | |
| 6,806,915 B2 * | 10/2004 | Koo | 348/614 |
| 6,807,167 B1 * | 10/2004 | Chakrabarti et al. | 370/352 |
| 6,810,039 B1 | 10/2004 | Parruck et al. | |
| 6,813,673 B2 * | 11/2004 | Kotlowski et al. | 710/305 |
| 6,816,750 B1 * | 11/2004 | Klaas | 700/121 |
| 6,826,187 B1 * | 11/2004 | Hey et al. | 370/395.6 |
| 6,839,352 B1 * | 1/2005 | Vogel | 370/395.1 |
| 6,845,412 B1 * | 1/2005 | Boike et al. | 710/36 |
| 6,853,385 B1 | 2/2005 | MacInnis et al. | |
| 6,892,324 B1 * | 5/2005 | French et al. | 714/38 |
| 6,928,080 B2 * | 8/2005 | Chen | 370/395.6 |
| 6,934,937 B1 * | 8/2005 | Johnson et al. | 717/129 |
| 6,952,238 B2 * | 10/2005 | Koo | 348/614 |
| 6,959,376 B1 * | 10/2005 | Boike et al. | 712/35 |
| 7,031,341 B2 * | 4/2006 | Yu | 370/469 |
| 7,051,246 B2 | 5/2006 | Benesty | |
| 7,100,026 B2 | 8/2006 | Dally et al. | |
| 7,110,358 B1 * | 9/2006 | Clinton et al. | 370/235 |
| 7,215,672 B2 * | 5/2007 | Reshef et al. | 370/395.1 |
| 7,218,901 B1 * | 5/2007 | Mobley et al. | 455/182.2 |
| 7,412,588 B2 * | 8/2008 | Georgiou et al. | 712/33 |
| 2001/0027392 A1 * | 10/2001 | Wiese, Jr. | 704/230 |
| 2001/0028658 A1 * | 10/2001 | Sakurai et al. | 370/407 |
| 2001/0043603 A1 * | 11/2001 | Yu | 370/393 |
| 2002/0008256 A1 * | 1/2002 | Liu | 257/207 |
| 2002/0009089 A1 * | 1/2002 | McWilliams | 370/401 |
| 2002/0031132 A1 * | 3/2002 | McWilliams | 370/401 |
| 2002/0031133 A1 * | 3/2002 | McWilliams | 370/401 |
| 2002/0031141 A1 * | 3/2002 | McWilliams | 370/463 |
| 2002/0034162 A1 * | 3/2002 | Brinkerhoff et al. | 370/229 |
| 2002/0046324 A1 * | 4/2002 | Barroso et al. | 711/122 |
| 2002/0059426 A1 * | 5/2002 | Brinkerhoff et al. | 709/226 |
| 2002/0087807 A1 * | 7/2002 | Gharachorloo et al. | 711/141 |
| 2002/0101982 A1 * | 8/2002 | Elabd | 379/406.01 |
| 2002/0112097 A1 * | 8/2002 | Milovanovic et al. | 709/331 |
| 2002/0126649 A1 * | 9/2002 | Sakurai et al. | 370/347 |
| 2002/0131421 A1 * | 9/2002 | Reshef et al. | 370/395.72 |
| 2002/0136220 A1 * | 9/2002 | Anjanaiah et al. | 370/395.1 |
| 2002/0136620 A1 | 9/2002 | Anjanaiah et al. | |
| 2002/0171769 A1 * | 11/2002 | Koo | 348/611 |
| 2003/0002538 A1 * | 1/2003 | Chen | 370/503 |
| 2003/0004697 A1 * | 1/2003 | Ferris | 703/13 |
| 2003/0021339 A1 * | 1/2003 | Koo | 375/229 |
| 2003/0046457 A1 * | 3/2003 | Anjanaiah et al. | 710/22 |
| 2003/0053484 A1 * | 3/2003 | Sorenson et al. | 370/468 |
| 2003/0053493 A1 * | 3/2003 | Graham Mobley et al. | 370/538 |
| 2003/0058885 A1 * | 3/2003 | Sorenson et al. | 370/468 |
| 2003/0076839 A1 * | 4/2003 | Li et al. | 370/395.6 |
| 2004/0088487 A1 * | 5/2004 | Barroso et al. | 711/122 |
| 2004/0109468 A1 * | 6/2004 | Anjanaiah | 370/463 |
| 2004/0202173 A1 * | 10/2004 | Yoon | 370/395.1 |
| 2005/0021874 A1 * | 1/2005 | Georgiou et al. | 709/250 |
| 2005/0216702 A1 * | 9/2005 | Paolucci et al. | 712/35 |
| 2007/0150700 A1 | 6/2007 | Dally et al. | |
| 2007/0239967 A1 | 10/2007 | Dally et al. | |

OTHER PUBLICATIONS

Mlynek et al., A System-on-a-chip for Multimedia Stream Processing and Communication, EUSIPCO 2000, International Society for Magnetic Resonance in Medicine.*

M.Weiss, F. Engel and G.P. Fettweis. A New Scalable DSP Architecture for System on Chip (SOC) Domains. In IEEE International Conference on Acoustics, Speech and Signal Processing (ICASSP), 1999.

Lyonnard et al., Automatic Generation of Applicaton-Specific Architectures for Heterogenous Multiprocessor System-on-Chip, Jun. 2001, ACM Press, pp. 518-523, Annual ACM IEEE Design Automation Conference.

Cuviello et al., Fault Modeling and Simulation for Cross in System on Chip Interconnects, Computer-Aided Design, 1999. Digest of Technical Papers. 1999 IEEE/ACM International Conference, Nov. 7-11, 1999, pp. 297-303.

Papachristou et al., Microprocessor based testing for core-based system on chip, 1999. ACM Press, Annual ACM IEEE Design Automation Conference, Proceedings of the 36th ACM/IEEE conference on Design Automation, pp. 586-591, ISBN: 1-58133-109-7.

Picone et al., Enhancing the Performance of Speech Recognition with Echo Cancellation, Apr. 11-14, 1988, Acoustics, Speech, and Signal Processing, 1988. ICASSP-88, pp. 529-532, vol. 1.

Wang et al., Hardware/Softeware Instruction Set Configurability for System-on-Chip Processors, Jun. 2001, ACM Press, Annual ACM IEEE Design Automation Conference, pp. 184-188, ISBN: 1-58113-297-2.

Lahiri et al, Fast Performance Analysis of Bus-Based System-On-Chip Communication Architectures, Nov. 7-11, 1999, pp. 566-572, Computer-Aided Design, 1999. Digest of Technical Papers. 1999 IEEE/ACM International Conference.

Juarez et al., A VLSI Architecture for MPEG-4 Stream Processing and Communication, Packet Video 2000, IEEE.

Juarez et al, A System-on-a-Chip for Multimedia Stream Processing and Communication, EUSIPCO 2000, International Society for Magnetic Resonance in Medicine.

* cited by examiner

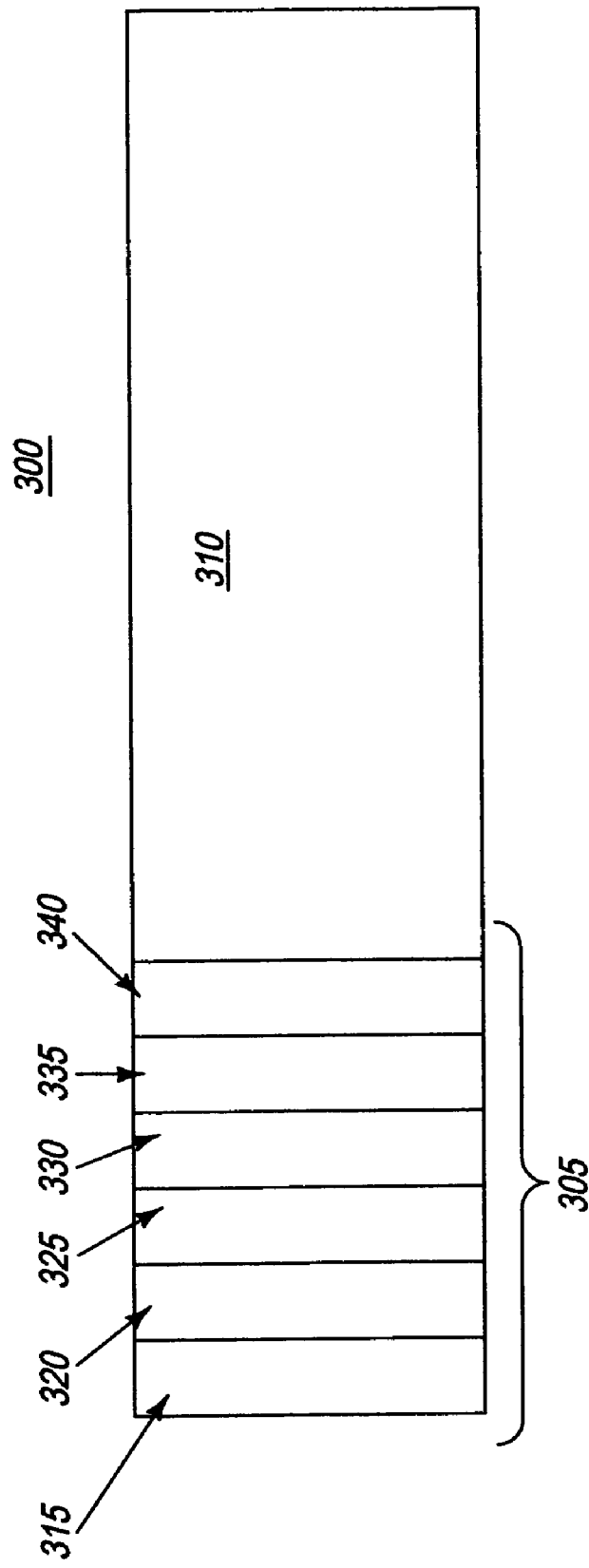

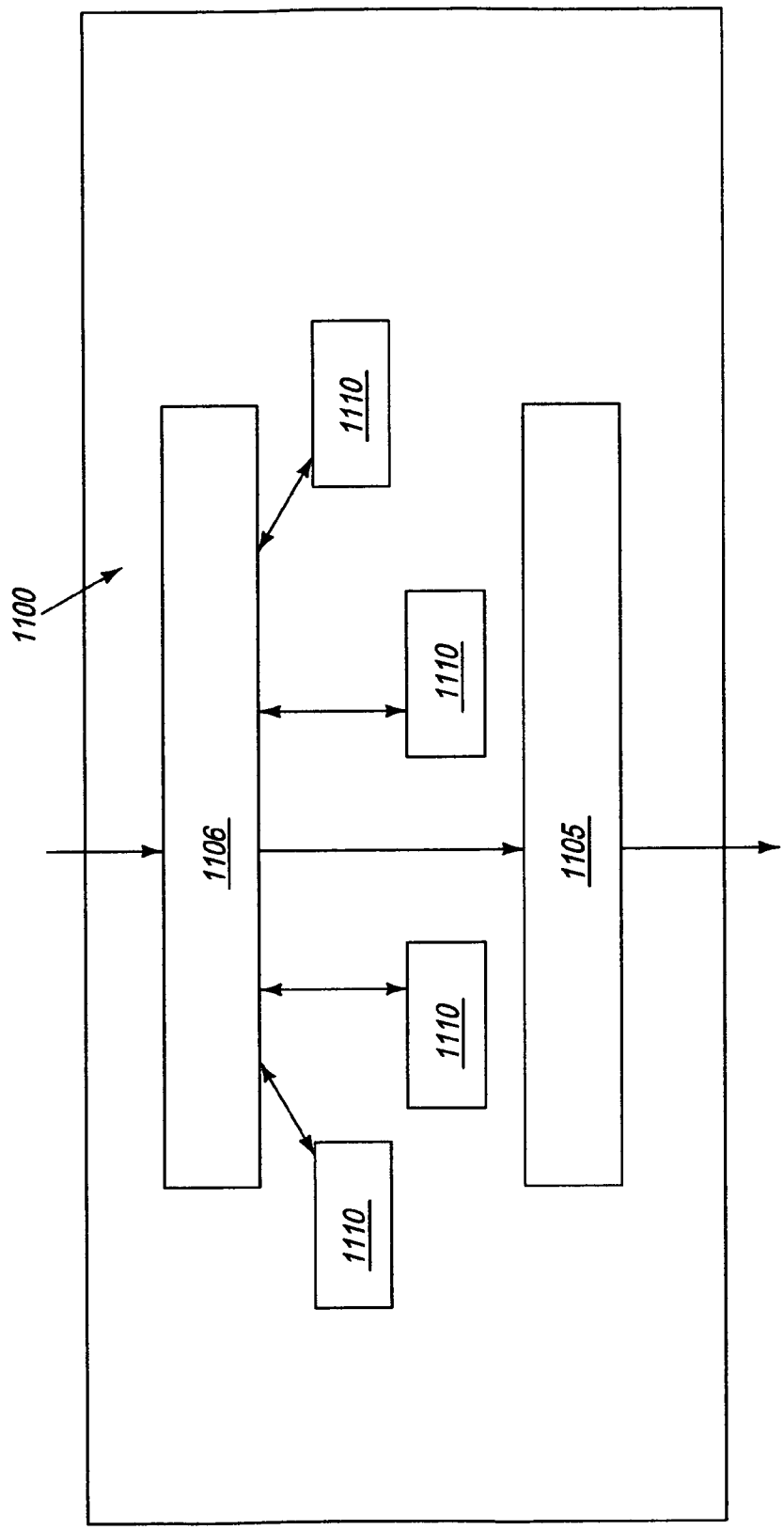

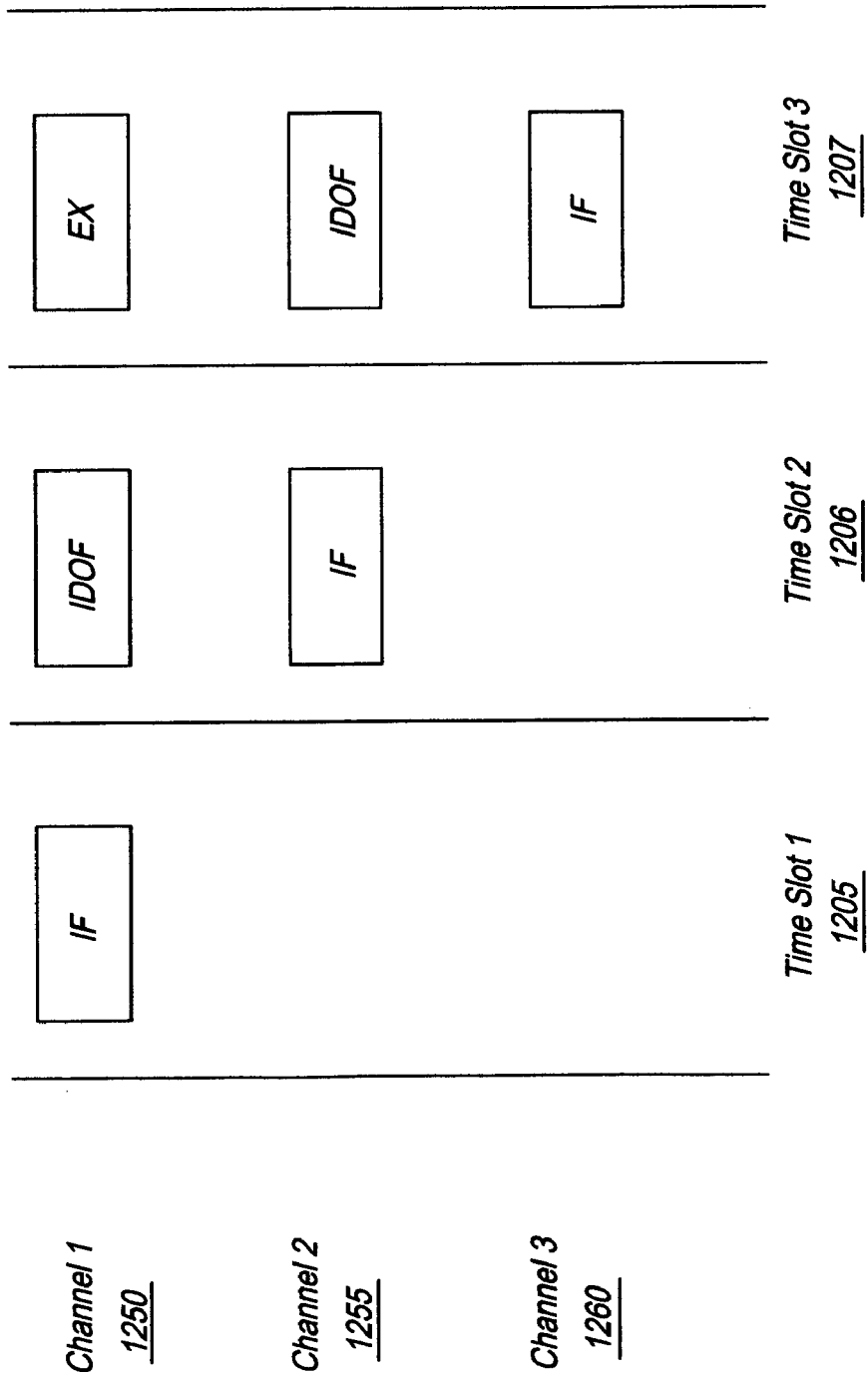

DISTRIBUTED PROCESSING ARCHITECTURE WITH SCALABLE PROCESSING LAYERS

FIELD OF THE INVENTION

The present invention relates generally to a system on chip architecture and, more specifically, to a scalable system on chip architecture having distributed processing units and memory banks in a plurality of processing layers.

BACKGROUND OF THE INVENTION

Media communication devices comprise hardware and software systems that utilize interdependent processes to enable the processing and transmission of analog and digital signals substantially seamlessly across and between circuit switched and packet switched networks. As an example, a voice over packet gateway enables the transmission of human voice from a conventional public switched network to a packet switched network, possibly traveling simultaneously over a single packet network line with both fax information and modem data, and back again. Benefits of unifying communication of different media across different networks include cost savings and the delivery of new and/or improved communication services such as web-enabled call centers for improved customer support and more efficient personal productivity tools.

Such media over packet communication devices (e.g., Media Gateways) require substantial, scalable processing power with sophisticated software controls and applications to enable the effective transmission of data from circuit switched to packet switched networks and back again. Exemplary products utilize at least one communication processor, such as Texas Instrument's 48-channel digital signal processor (DSP) chip, to deploy a software architecture, such as the system provided by Telogy Networks, which, in combination, offer features such as adaptive voice activity detection, adaptive comfort noise generation, adaptive jitter buffer, industry standard codecs, echo cancellation, tone detection and generation, network management support, and packetization.

One form of a media communication device, a voice over packet processing system, uses multiple DSPs to perform the conversion between voice data signals and packet-based digital data. Each of the general-purpose DSPs performs tasks such as encoding, decoding, echo cancellation, and so forth; however, the use of general-purpose DSPs has several disadvantages. First, a general-purpose DSP is not optimized for performing any particular function. Therefore, a DSP typically includes a large number of functional units. Second, because each DSP typically completes processing of one unit of incoming data before it starts processing the next unit of incoming data, units of incoming data may have to wait for a DSP to become available. For example, assume that it takes one second for a DSP to process one unit of incoming data, then the DSP can accept new incoming data approximately once per second on average.

Exemplary processors are disclosed in U.S. Pat. Nos. 6,226,735, 6,122,719, 6,108,760, 5,956,518, and 5,915,123. The patents are directed to a hybrid digital signal processor (DSP)/RISC chip that has an adaptive instruction set, making it possible to reconfigure the interconnect and the function of a series of basic building blocks, like multipliers and arithmetic logic units (ALUs), on a cycle-by-cycle basis. This provides an instruction set architecture that can be dynamically customized to match the particular requirements of the running applications and, therefore, create a custom path for that particular instruction for that particular cycle. According to the patents, rather than separate the resources for instruction storage and distribution from the resources for data storage and computation, and dedicate silicon resources to each of these resources at fabrication time, these resources can be unified. Once unified, traditional instruction and control resources can be decomposed along with computing resources and can be deployed in an application specific manner. Chip capacity can be selectively deployed to dynamically support active computation or control reuse of computational resources depending on the needs of the application and the available hardware resources. This, theoretically, results in improved performance.

While existing solutions are capable of generally enabling the processing and transmission of certain media types across circuit and packet switched networks, they suffer from certain disadvantages. As designed, they are not able to support a sufficiently high density of channels per chip while still providing the features required by carrier-class telecommunication companies. Furthermore, expanding the number of channels served and/or features provided to meet new or different data volumes by adding new hardware or software components is challenging and requires substantial redesign. Moreover, existing architectures do not enable the scalable addition of processing power or modification of processing tasks without substantial redesigns.

Despite the aforementioned prior art, an improved method and system for enabling the communication of media across different networks is needed. More specifically, a system on chip architecture is needed that can be efficiently scaled to meet new processing requirements and is sufficiently distributed to enable high processing throughputs and increased production yields.

SUMMARY OF THE INVENTION

The present invention is directed toward a system on chip architecture having scalable, distributed processing and memory capabilities through a plurality of processing layers. In a preferred embodiment, a distributed processing layer processor (DPLP) comprises a plurality of processing layers each in communication with a processing layer controller and central direct memory access controller via communication data buses and processing layer interfaces. Within each processing layer, a plurality of pipelined processing units (PUs) are in communication with a plurality of program memories and data memories. Preferably, each PU should be capable of accessing at least one program memory and one data memory. The processing layer controller manages the scheduling of tasks and distribution of processing tasks to each processing layer.

The Direct Memory Access (DMA) controller is a multi-channel DMA unit for handling the data transfers between the local memory buffer Pus and external memories, such as the DRAM. Within each processing layer, there are a plurality of pipelined PUs specially designed for conducting a defined set of processing tasks. In that regard, the PUs are not general-purpose processors and can not be used to conduct any processing task. Additionally, within each processing layer is a set of distributed memory banks that enable the local storage of instruction sets, processed information and other data required to conduct an assigned processing task.

One application of the present invention is in a media gateway that is designed to enable the communication of media across circuit switched and packet switched networks. The hardware system architecture of the gateway is comprised of a plurality of DPLPs, referred to as Media Engines, that are interconnected with a Host Processor and Packet Engine which, in turn, is in communication with interfaces to networks, preferably an asynchronous transfer mode (ATM) physical device or gigabit media independent interface (GMII) physical device. Each of the PUs within the processing layers of the Media Engines are specially designed to perform a class of media processing specific tasks, such as line echo cancellation, encoding or decoding data, or tone signaling.

BRIEF DESCRIPTION OF THE DRAWINGS

These and other features and advantages of the present invention will be appreciated as they become better understood by reference to the following Detailed Description when considered in connection with the accompanying drawings, wherein:

FIG. 3 is a diagram of a packet having a header and user data;

FIG. 11 is a block diagram representation of a first preferred processing unit;

FIG. 12 is a time-based schematic of the pipeline processing conducted by the first preferred processing unit;

FIG. 19 is a schematic diagram of preferred components comprising the media processing subsystem of the software system of the present invention;

FIG. 20 is a schematic diagram of preferred components comprising the packetization processing subsystem of the software system of the present invention;

FIG. 21 is a schematic diagram of preferred components comprising the signaling subsystem of the software system of the present invention;

DETAILED DESCRIPTION OF THE INVENTION

Figure 1:
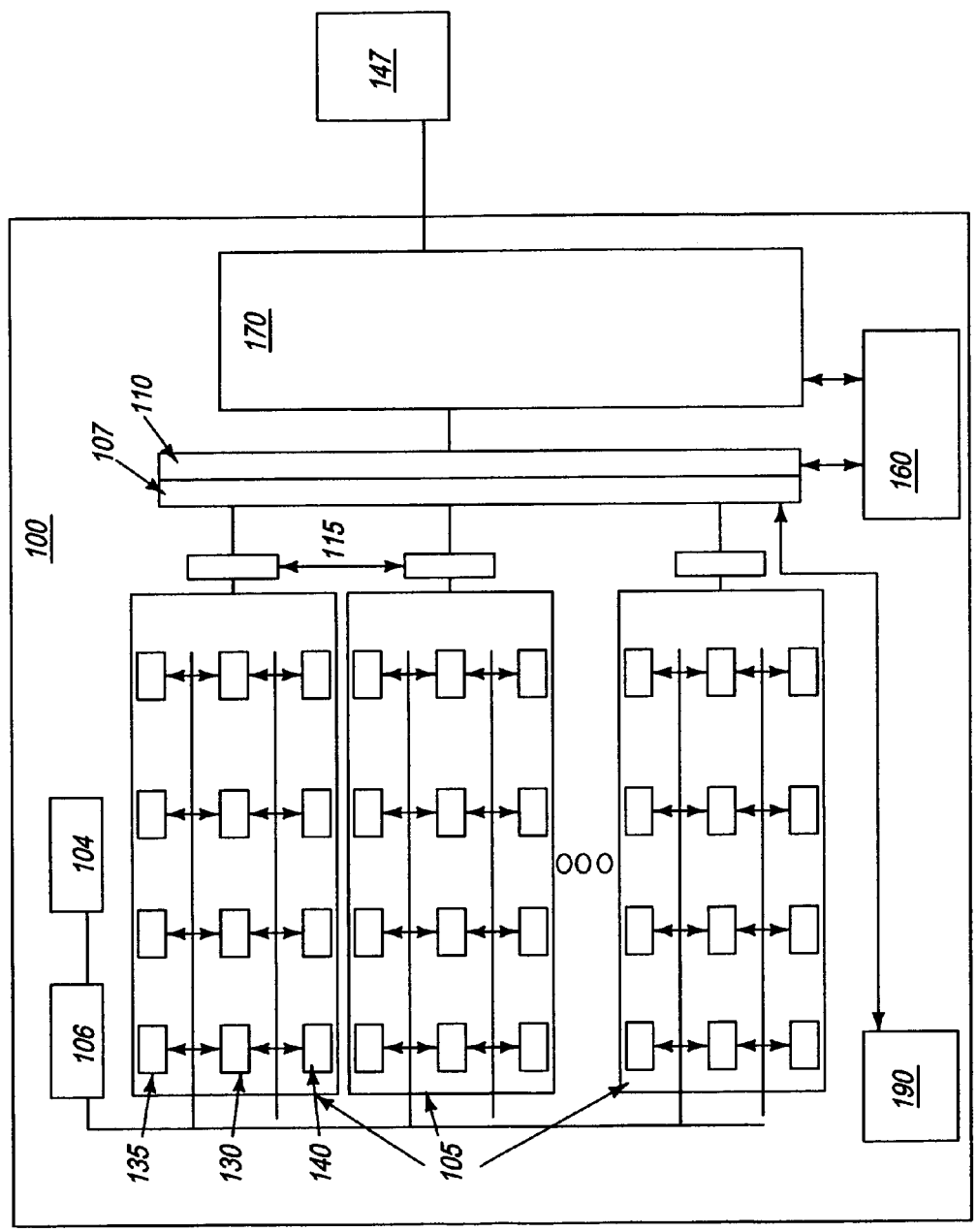
FIG. 1 is a block diagram of an embodiment of the distributed processing layer processor.

The present invention is a system on chip architecture having scalable, distributed processing and memory capabilities through a plurality of processing layers. One embodiment of the present invention is a novel media gateway, designed to enable the communication of media across circuit switched and packet switched networks, and encompasses novel hardware and software methods and systems. The present invention will presently be described with reference to the aforementioned drawings. Headers will be used for purposes of clarity and are not meant to limit or otherwise restrict the disclosures made herein. It will further be appreciated, by those skilled in the art, that use of the term "media" is meant to broadly encompass substantially all types of data that could be sent across a packet switched or circuit switched network, including, but not limited to, voice, video, data, and fax traffic. Where arrows are utilized in the drawings, it would be appreciated by one of ordinary skill in the art that the arrows represent the interconnection of elements and/or components via buses or any other type of communication channel.

Referring to FIG. 1, a block diagram of an exemplary distributed processing layer processor (DPLP) 100 is shown. The DPLP 100 comprises a plurality of processing layers 105 each in communication with a processing layer controller 107 and central direct memory access (DMA) controller 110 via communication data buses and processing layer interfaces 115. Each processing layer 105 is in communication with a CPU interface 106, which, in turn, is in communication with a CPU 104. Within each processing layer 105, a plurality of pipelined processing units (PUs) 130 are in communication with a plurality of program memories 135 and data memories 140, via communication data buses. Preferably, each program memory 135 and data memory 140 can be accessed by at least one PU 130 via data buses. Each of the PUs 130, program memories 135, and data memories 140 is in communication with an external memory 147 via communication data buses.

In a preferred embodiment, the processing layer controller 107 manages the scheduling of tasks and distribution of processing tasks to each processing layer 105. The processing layer controller 107 arbitrates data and program code transfer requests to and from the program memories 135 and data memories 140 in a round robin fashion. On the basis of this arbitration, the processing layer controller 107 fills the data pathways that define how units directly access memory, namely the DMA channels [not shown]. The processing layer controller 107 is capable of performing instruction decoding to route an instruction according to its dataflow and keep track of the request states for all PUs 130, such as the state of a read-in request, a write-back request and an instruction forwarding. The processing layer controller 107 is further capable of conducting interface related functions, such as programming DMA channels, starting signal generation, maintaining page states for PUs 130 in each processing layer 105, decoding of scheduler instructions, and managing the movement of data from and into the task queues of each PU 130. By performing the aforementioned functions, the processing layer controller 107 substantially eliminates the need for associating complex state machines with the PUs 130 present in each processing layer 105.

The DMA controller 110 is a multi-channel DMA unit for handling the data transfers between the local memory buffer PUs and external memories, such as the SDRAM. Each processing layer 105 has independent DMA channels allocated for transferring data to and from the PU local memory buffers. Preferably, there is an arbitration process, such as a single level of round robin arbitration, between the channels within the DMA to access the external memory. The DMA controller 110 provides hardware support for round robin request arbitration across the PUs 130 and processing layers 105. Each DMA channel functions independently of each other. In an exemplary operation, it is preferred to conduct transfers between local PU memories and external memories by utilizing the address of the local memory, address of the external memory, size of the transfer, direction of the transfer, namely whether the DMA channel is transferring data to the local memory from the external memory or vice-versa, and how many transfers are required for each PU 130. The DMA controller 110 is preferably further capable of arbitrating priority for program code fetch requests, conducting link list traversal and DMA channel information generation, and performing DMA channel prefetch and done signal generation.

The processing layer controller 107 and DMA controller 110 are in communication with a plurality of communication interfaces 160, 190 through which control information and data transmission occurs. Preferably the DPLP 100 includes an external memory interface (such as a SDRAM interface) 170 that is in communication with the processing layer controller 107 and DMA controller 110 and is in communication with an external memory 147.

Within each processing layer 105, there are a plurality of pipelined PUs 130 specially designed for conducting a defined set of processing tasks. In that regard, the PUs are not general-purpose processors and can not be used to conduct any processing task. A survey and analysis of specific processing tasks yielded certain functional unit commonalities that, when combined, yield a specialized PU capable of optimally processing the universe of those specialized processing tasks. The instruction set architecture of each PU yields compact code. Increased code density results in a decrease in required memory and, consequently, a decrease in required area, power, and memory traffic.

It is preferred that, within each processing layer, the PUs 130 operate on tasks scheduled by the processing layer controller 107 through a first-in, first-out (FIFO) task queue [not shown]. The pipeline architecture improves performance. Pipelining is an implementation technique whereby multiple instructions are overlapped in execution. In a computer pipeline, each step in the pipeline completes a part of an instruction. Like an assembly line, different steps are completing different parts of different instructions in parallel. Each of these steps is called a pipe stage or a data segment. The stages are connected on to the next one to form a pipe. Within a processor, instructions enter the pipe at one end, progress through the stages, and exit at the other end. The throughput of an instruction pipeline is determined by how often an instruction exits the pipeline.

Additionally, within each processing layer 105 is a set of distributed memory banks 140 that enable the local storage of instruction sets, processed information and other data required to conduct an assigned processing task. By having memories 140 distributed within discrete processing layers 105, the DPLP 100 remains flexible and, in production, delivers high yields. Conventionally, certain DSP chips are not produced with more than 9 megabytes of memory on a single chip because as memory blocks increase, the probability of bad wafers (due to corrupted memory blocks) also increases. In the present invention, the DPLP 100 can be produced with 12 megabytes or more of memory by incorporating redundant processing layers 105. The ability to incorporate redundant processing layers 105 enables the production of chips with larger amounts of memory because, if a set of memory blocks are bad, rather than throw the entire chip away, the discrete processing layers within which the corrupted memory units are found can be set aside and the other processing layers may be used instead. The scalable nature of the multiple processing layers allows for redundancy and, consequently, higher production yields.

While the layered architecture of the present invention is not limited to a specific number of processing layers, certain practical limitations may restrict the number of processing layers that can be incorporated into a single DPLP. One of ordinary skill in the art would appreciate how to determine the processing limitations imposed by external conditions, such as traffic and bandwidth constraints on the system, that restrict the feasible number of processing layers.

Exemplary Application

The present invention can be used to enable the operation of a novel media gateway. The hardware system architecture of the gateway is comprised of a plurality of DPLPs, referred to as Media Engines, that are in communication with a data bus and interconnected with a Host Processor or a Packet Engine which, in turn, is in communication with interfaces to networks, preferably an asynchronous transfer mode (ATM) physical device or gigabit media independent interface (GMII) physical device.

Figure 2A:
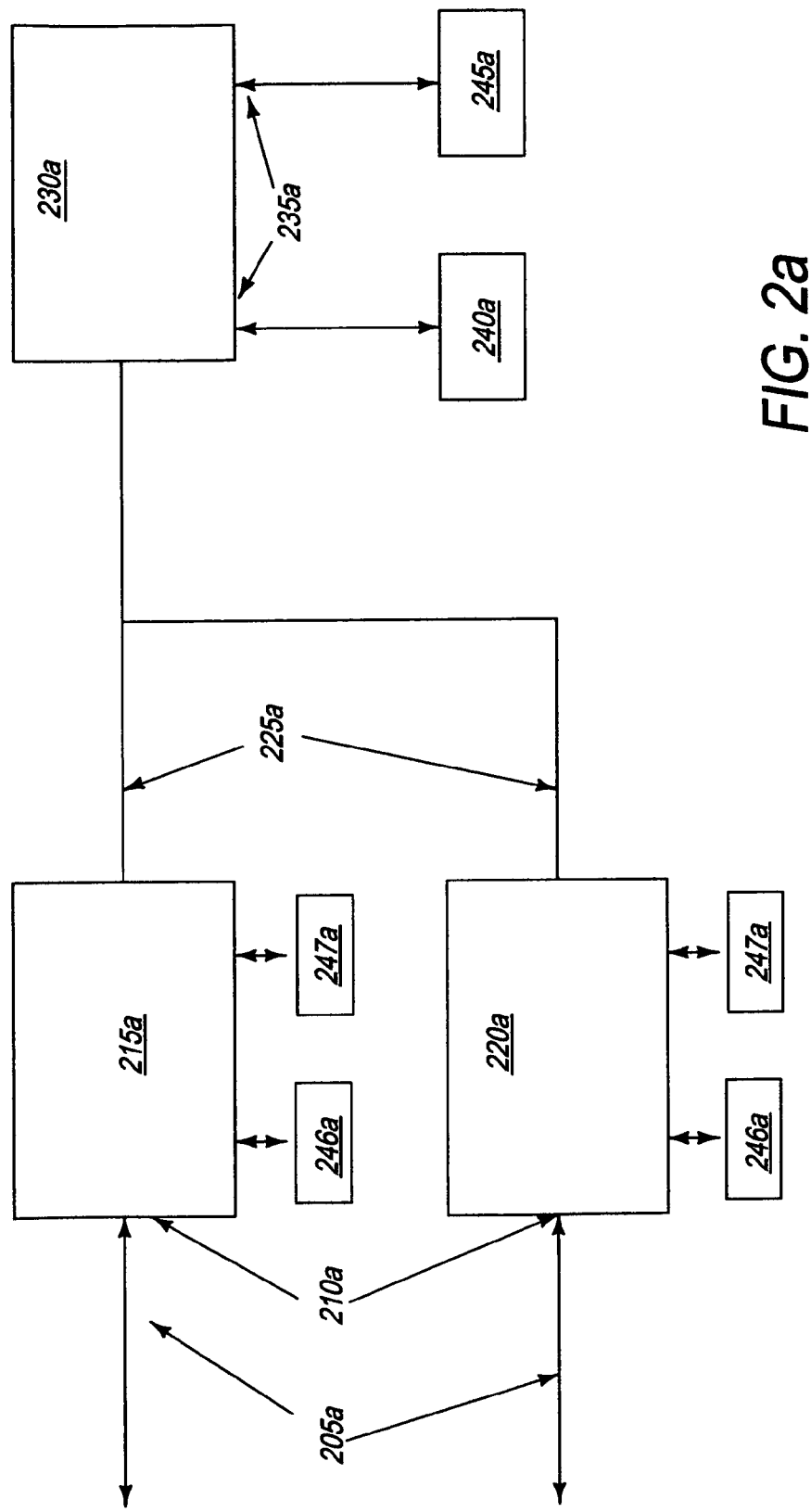
FIG. 2a is a block diagram of a first embodiment of a hardware system architecture for a media gateway.

Referring to FIG. 2a, a first embodiment of the top-level hardware system architecture is shown. A data bus 205a is connected to interfaces 210a existent on a first novel Media Engine Type I 215a and on a second novel Media Engine Type I 220a. The first novel Media Engine Type I 215a and second novel Media Engine Type I 220a are connected through a second set of communication buses 225a to a novel Packet Engine 230a which, in turn, is connected through interfaces 235a to outputs 240a, 245a Preferably, each of the Media Engines Type I 215a, 220a is in communication with a SRAM 246a and SDRAM 247a.

It is preferred that the data bus 205a be a time-division multiplex (TDM) bus. A TDM bus is a pathway for the transmission of a number of separate voice, fax, modem, video, and/or other data signals simultaneously over a single communication medium. The separate signals are transmitted by interleaving a portion of each signal with each other, thereby enabling one communications channel to handle multiple separate transmissions and avoiding having to dedicate a separate communication channel to each transmission. Existing networks use TDM to transmit data from one communication device to another. It is further preferred that the interfaces 210a existent on the first novel Media Engine Type I 215a and second novel Media Engine Type I 220a comply with H.100, a hardware specification that details the necessary information to implement a CT bus interface at the physical layer for the PCI computer chassis card slot, independent of software specifications. The CT bus defines a single isochronous communications bus across certain PC chassis card slots and allows for the relatively fluid interoperation of components. It is appreciated that interfaces abiding by different hardware specifications could be used to receive signals from the data bus 205a.

As described below, each of the two novel Media Engines Type I 215a, 220a can support a plurality of channels for processing media, such as voice. The specific number of channels supported is dependent upon the features required, such as the extent of echo cancellation, and type of codec supported. For codecs having relatively low processing power requirements, such as G.711, each Media Engine Type I 215a, 220a can support the processing of around 256 voice channels or more. Each Media Engine Type I 215a, 220a is in communication with the Packet Engine 230a through a communication bus 225a, preferably a peripheral component interconnect (PCI) communication bus. A PCI communication bus serves to deliver control information and data transfers between the Media Engine Type I chip 215a, 220a and the Packet Engine chip 230a Because Media Engine Type I 215a, 220a was designed to support the processing of lower data volumes, relative to Media Engine Type II described below, a single PCI communication bus can effectively support the transfer of both control and data between the designated chips. It is appreciated, however, that where data traffic becomes too great, the PCI communication bus must be supplemented with a second inter-chip communication bus.

The Packet Engine 230a receives processed data from each of the two Media Engines Type I 215a, 220a via the communication bus 225a While theoretically able to connect to a plurality of Media Engines Type I, it is preferred that, for this embodiment, the Packet Engine 230a be in communication with up to two Media Engines Type I 215a, 220a. As will be further described below, the Packet Engine 230a provides cell and packet encapsulation for data channels, at or around 2016 channels in a preferred embodiment, quality of service functions for traffic management, tagging for differentiated services and multi-protocol label switching, and the ability to bridge cell and packet networks. While it is preferred to use the Packet Engine 230a, it can be replaced with a different host processor, provided that the host processor is capable of performing the above-described functions of the Packet Engine 230a.

The Packet Engine 230a is in communication with an ATM physical device 240a and GMII physical device 245a. The ATM physical device 240a is capable of receiving processed and packtized data, as passed from the Media Engines Type I 215a, 220a through the Packet Engine 230a, and transmitting it through a network operating on an asynchronous transfer mode (an ATM network). As would be appreciated by one of ordinary skill in the art, an ATM network automatically adjusts the network capacity to meet the system needs and can handle voice, modem, fax, video and other data signals. Each ATM data cell, or packet, consists of five octets of header field plus 48 octets for user data. The header contains data that identifies the related cell, a logical address that identifies the routing, header error correction bits, plus bits for priority handling and network management functions. An ATM network is a wideband, low delay, connection-oriented, packet-like switching and multiplexing network that allows for relatively flexible use of the transmission bandwidth. The GMII physical device 245a operates under a standard for the receipt and transmission of a certain amount of data, irrespective of the media types involved.

The embodiment shown in FIG. 2a can deliver voice processing up to Optical Carrier Level 1 (OC-1). OC-1 is designated at 51,840 million bits per second and provides for the direct electrical-to-optical mapping of the synchronous transport signal (STS-1) with frame synchronous scrambling. Higher optical carrier levels are direct multiples of OC-1, namely OC-3 is three times the rate of OC-1. As shown below, other configurations of the present invention could be used to support voice processing at OC-12.

Figure 2B:
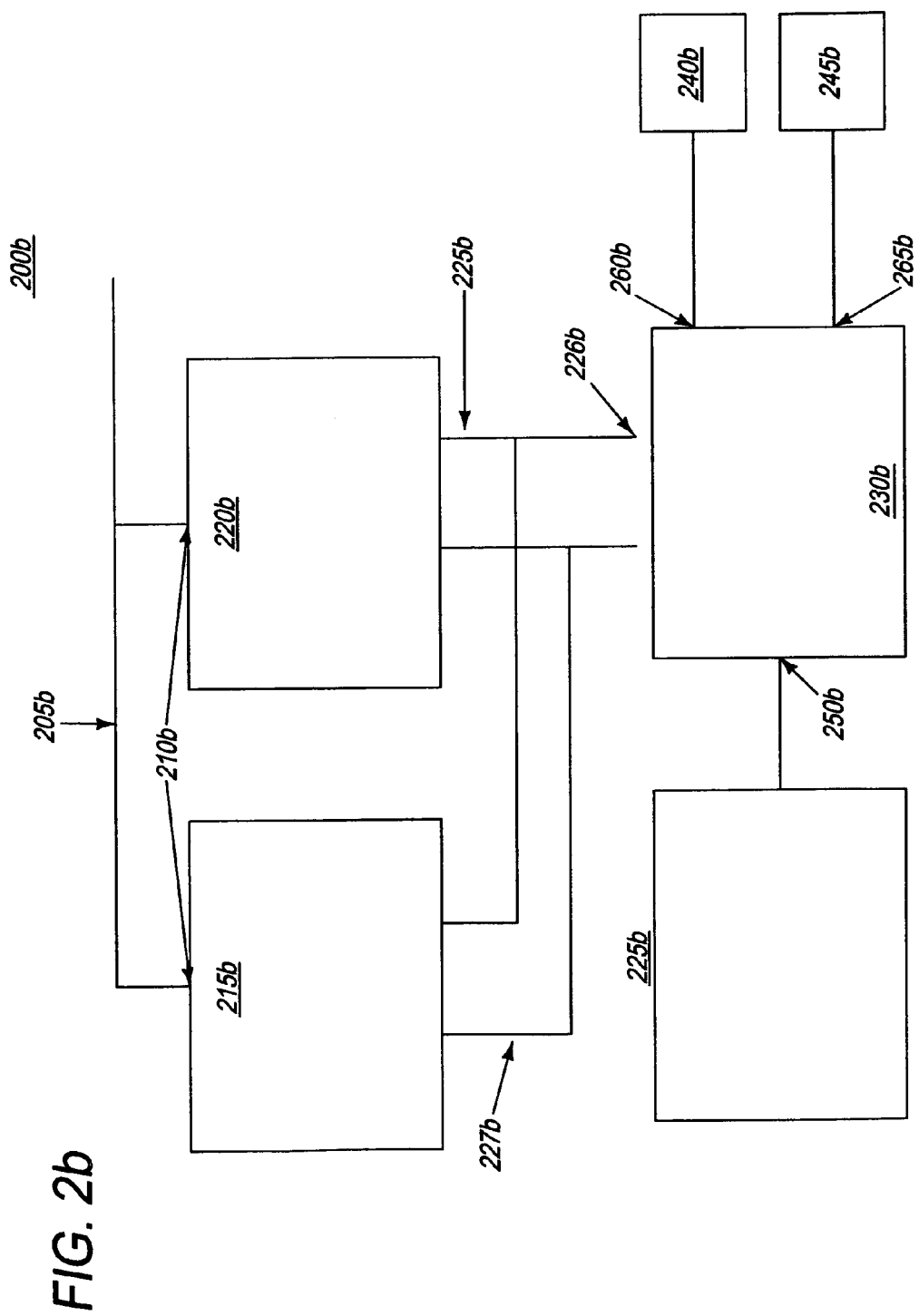
FIG. 2b is a block diagram of a second embodiment of a hardware system architecture for a media gateway.

Referring now to FIG. 2b, an embodiment supporting data rates up to OC-3 is shown, referred to herein as an OC-3 Tile 200b. A data bus 205b is connected to interfaces 210b existent on a first novel Media Engine Type II 215b and on a second novel Media Engine Type II 220b. The first novel Media Engine Type II 215b and second novel Media Engine Type II 220b are connected through a second set of communication buses 225b, 227b to a novel Packet Engine 230b which, in turn, is connected through interfaces 260b, 265b to outputs 240b, 245b and through interface 250b to a Host Processor 255b.

As previously discussed, it is preferred that the data bus 205b be a time-division multiplex (TDM) bus and that the interfaces 210b existent on the first novel Media Engine Type II 215b and second novel Media Engine Type II 220b comply with the H.100 a hardware specification. It is again appreciated that interfaces abiding by different hardware specifications could be used to receive signals from the data bus 205b.

Each of the two novel Media Engines Type II 215b, 220b can support a plurality of channels for processing media, such as voice. The specific number of channels supported is dependent upon the features required, such as the extent of echo cancellation, and type of codec implemented. For codecs having relatively low processing power requirements, such as G.711, and where the extent of echo cancellation required is 128 milliseconds, each Media Engine Type II can support the processing of approximately 2016 channels of voice. With two Media Engines Type II providing the processing power, this configuration is capable of supporting data rates of OC-3. Where the Media Engines Type II 215b, 220b are implementing a codec requiring higher processing power, such as G.729A, the number of supported channels decreases. As an example, the number of supported channels decreases from 2016 per Media Engine Type II when supporting G.711 to approximately 672 to 1024 channels when supporting G.729A. To match OC-3, an additional Media Engine Type II can be connected to the Packet Engine 230b via the common communication buses 225b, 227b.

Each Media Engine Type II 215b, 220b is in communication with the Packet Engine 230b through communication buses 225b, 227b, preferably a peripheral component interconnect (PCI) communication bus 225b and a UTOPIA II/POS II communication bus 227b. As previously mentioned, where data traffic volumes exceed a certain threshold, the PCI communication bus 225b must be supplemented with a second communication bus 227b. Preferably, the second communication bus 227b is a UTOPIA II/POS-II bus and serves as the data path between Media Engines Type II 215b, 220b and the Packet Engine 230b. A POS (Packet over SONET) bus represents a high-speed means for transmitting data through a direct connection, allowing the passing of data in its native format without the addition of any significant level of overhead in the form of signaling and control information. UTOPIA Universal Test and Operations Interface for ATM) refers to an electrical interface between the transmission convergence and physical medium dependent sublayers of the physical layer and acts as the interface for devices connecting to an ATM network.

The physical interface is configured to operate in POS-II mode, which allows for variable size data frame transfers. Each packet is transferred using POS-II control signals to explicitly define the start and end of a packet As shown in FIG. 3, each packet 300 contains a header 305 with a plurality of information fields and user data 310. Preferably, each header 305 contains information fields including packet type 315 (e.g., RTP, raw encoded voice, AAL2), packet length 320 (total length of the packet including information fields), and channel identification 325 (identifies the physical channel, namely the TDM slot for which the packet is intended or from which the packet came). When dealing with encoded data transfers between a Media Engine Type II 215b, 220b and Packet Engine 230b, it is further preferred to include coder/decoder type 330, sequence number 335, and voice activity detection decision 340 in the header 305.

The Packet Engine 230b is in communication with the Host Processor 255b through a PCI target interface 250b. The Packet Engine 230b preferably includes a PCI to PCI bridge [not shown] between the PCI interface 226b to the PCI communication bus 225b and the PCI target interface 250b. The PCI to PCI bridge serves as a link for communicating messages between the Host Processor 255b and two Media Engines Type II 215b, 220b.

The novel Packet Engine 230b receives processed data from each of the two Media Engines Type II 215b, 220b via the communication buses 225b, 227b. While theoretically able to connect to a plurality of Media Engines Type II, it is preferred that the Packet Engine 230b be in communication with no more than three Media Engines Type II 215b, 220b [only two are shown in FIG. 2b]. As with the previously described embodiment, Packet Engine 230b provides cell and packet encapsulation for data channels, up to 2048 channels when implementing a G.711 codec, quality of service functions for traffic management, tagging for differentiated services and multi-protocol label switching, and the ability to bridge cell and packet networks. The Packet Engine 230b is in communication with an ATM physical device 240b and GMII physical device 245b through a UTOPIA II/POS II compatible interface 260b and GMII compatible interface respectively 265b. In addition to the GMII interface 265b in the physical layer, referred to herein as the PHY GMII interface, the Packet Engine 230b also preferably has another GMII interface [not shown] in the MAC layer of the network, referred to herein as the MAC GMII interface. MAC is a media specific access control protocol defining the lower half of the data link layer that defines topology dependent access control protocols for industry standard local area network specifications.

As will be further discussed, the Packet Engine 230b is designed to enable ATM-IP internetworking. Telecommunication service providers have built independent networks operating on an ATM or IP protocol basis. Enabling ATM-IP internetworking permits service providers to support the delivery of substantially all digital services across a single networking infrastructure, thereby reducing the complexities introduced by having multiple technologies/protocols operative throughout a service provider's entire network. The Packet Engine 230b is therefore designed to enable a common network infrastructure by providing for the internetworking between ATM modes and IP modes.

More specifically, the novel Packet Engine 230b supports the internetworking of ATM AALs (ATM Adaptation Layers) to specific IP protocols. Divided into a convergence sublayer and segmentation/reassembly sublayer, AAL accomplishes conversion from the higher layer, native data format and service specifications into the ATM layer. From the data originating source, the process includes segmentation of the original and larger set of data into the size and format of an ATM cell, which comprises 48 octets of data payload and 5 octets of overhead. On the receiving side, the AAL accomplishes reassembly of the data AAL-1 functions in support of Class A traffic that is connection-oriented Constant Bit Rate (CBR), time-dependent traffic, such as uncompressed, digitized voice and video, and which is stream-oriented and relatively intolerant of delay. AAL-2 functions in support of Class B traffic that is connection-oriented Variable Bit Rate (VBR) isochronous traffic requiring relatively precise timing between source and sink, such as compressed voice and video. AAL-5 functions in support of Class C traffic which is Variable Bit Rate (VBR) delay-tolerant connection-oriented data traffic requiring relatively minimal sequencing or error detection support such as signaling and control data.

These ATM AALs are internetworked with protocols operative in an IP network, such as RTP, UDP, TCP and IP. Internet Protocol (IP) describes software that tracks the Internet's addresses for different nodes, routes outgoing messages, and recognizes incoming messages while allowing a data packet to traverse multiple networks from source to destination. Realtime Transport Protocol (RTP) is a standard for streaming realtime multimedia over IP in packets and supports transport of real-time data, such as interactive video and video over packet switched networks. Transmission Control Protocol (TCP) is a transport layer, connection oriented, end-to-end protocol that provides relatively reliable, sequenced, and unduplicated delivery of bytes to a remote or a local user. User Datagram Protocol (UDP) provides for the exchange of datagrams without acknowledgements or guaranteed delivery and is a transport layer, connectionless mode protocol. In the preferred embodiment represented in FIG. 2b it is preferred that ATM AAL-1 be internetworked with RTP, UDP, and IP protocols, AAL-2 be internetworked with UDP and IP protocols, and AAL-5 be internetworked with UDP and IP protocols or TCP and IP protocols.

Figure 4:
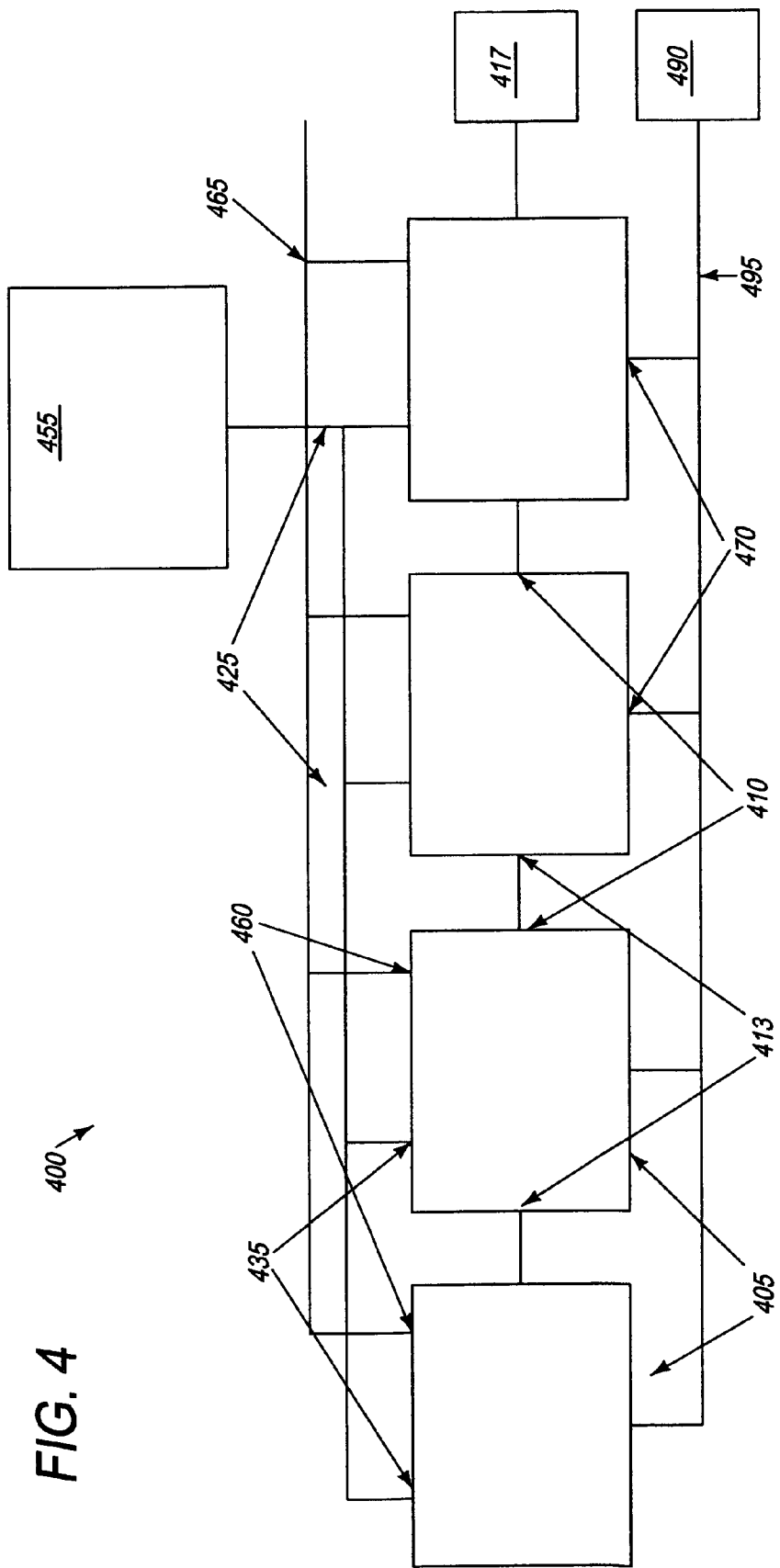
FIG. 4 is a block diagram of a third embodiment of a hardware system architecture for a media gateway.

Multiple OC-3 tiles, as presented in FIG. 2b, can be interconnected to form a tile supporting higher data rates. As shown in FIG. 4, four OC-3 tiles 405 can be interconnected, or "daisy chained", together to form an OC-12 tile 400. Daisy chaining is a method of connecting devices in a series such that signals are passed through the chain from one device to the next. By enabling daisy chaining, the present invention provides for currently unavailable levels of scalability in data volume support and hardware implementation. A Host Processor 455 is connected via communication buses 425, preferably PCI communication buses, to the PCI interface 435 on each of the OC-3 tiles 405. Each OC-3 tile 405 has a TDM interface 460 that operates via a TDM communication bus 465 to receive TDM signals via a TDM interface [not shown]. Each OC-3 tile 405 is further in communication with an ATM physical device 490 through a communication bus 495 connected to the OC-3 file 405 through a UTOPIA II/POS II interface 470. Data received by an OC-3 tile 405 and not processed, because, for example, the data packet is directed toward a specific packet engine address that was not found in that specific OC-3 tile 405, is sent to the next OC-3 tile 405 in the series via the PHY GMII interface 410 and received by the next OC-3 tile via the MAC GMII interface 413. Enabling daisy chaining eliminates the need for an external aggregator to interface the GMII interfaces on each of the OC-3 tiles in order to enable integration. The final OC-3 tile 405 is in communication with a GMII physical device 417 via the PHY GMII interface 410.

Figure 5:
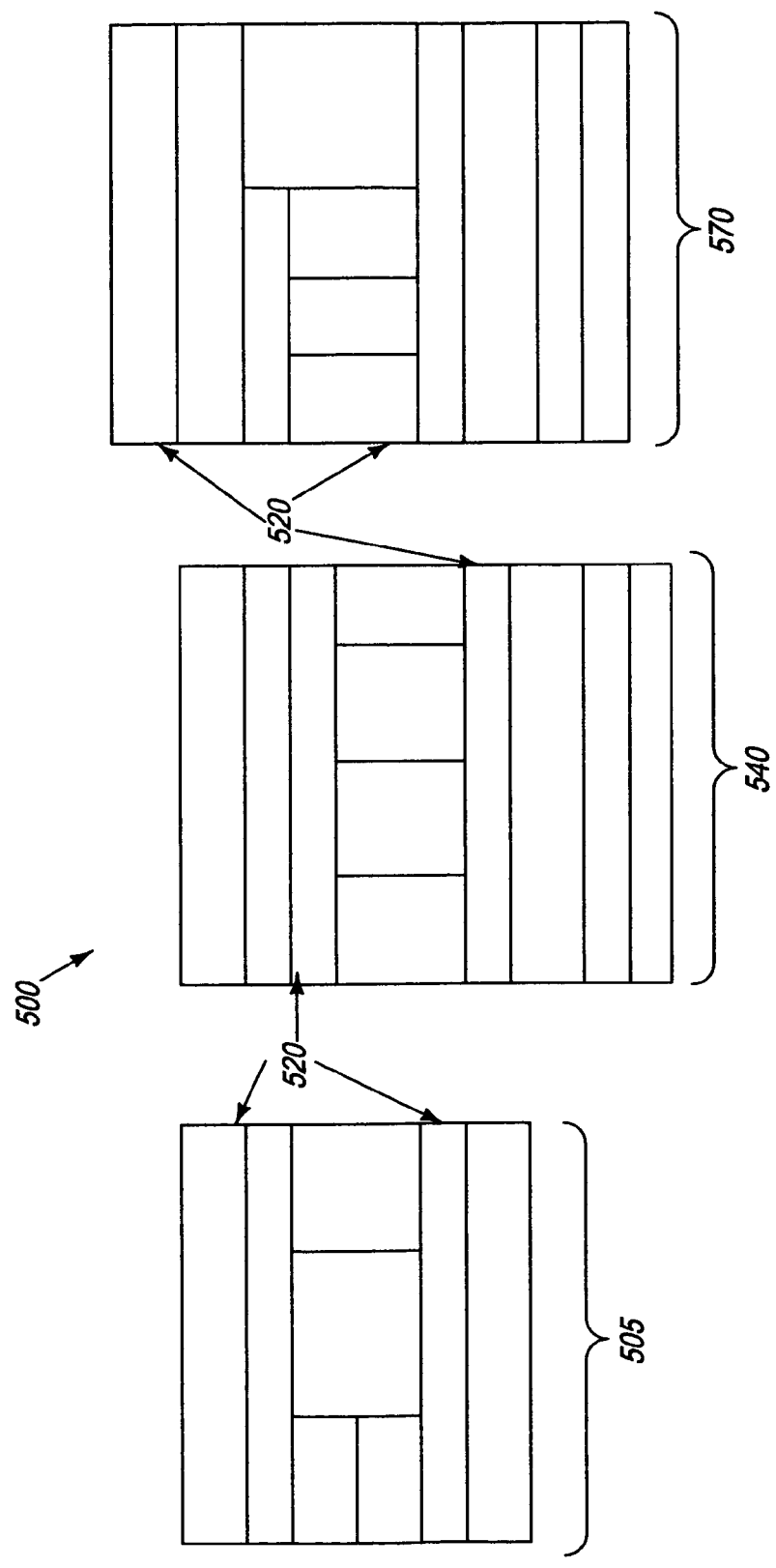
FIG. 5 is a block diagram of one logical division of the software system of the present invention.

Operating on the above-described hardware architecture embodiments is a plurality of novel, integrated software systems designed to enable media processing, signaling, and packet processing. Referring now to FIG. 5, a logical division of the software system 500 is shown. The software system 500 is divided into three subsystems, a Media Processing Subsystem 505, a Packetization Subsystem 540, and a Signaling/Management Subsystem 570. Each subsystem 505, 540, 570 further comprises a series of modules 520 designed to perform different tasks in order to effectuate the processing and transmission of media. It is preferred that the modules 520 be designed in order to encompass a single core task that is substantially non-divisible. For example, exemplary modules include echo cancellation, codec implementation, scheduling, IP-based packetization, and ATM-based packetization, among others. The nature and functionality of the modules 520 deployed in the present invention will be further described below.

Figure 6:
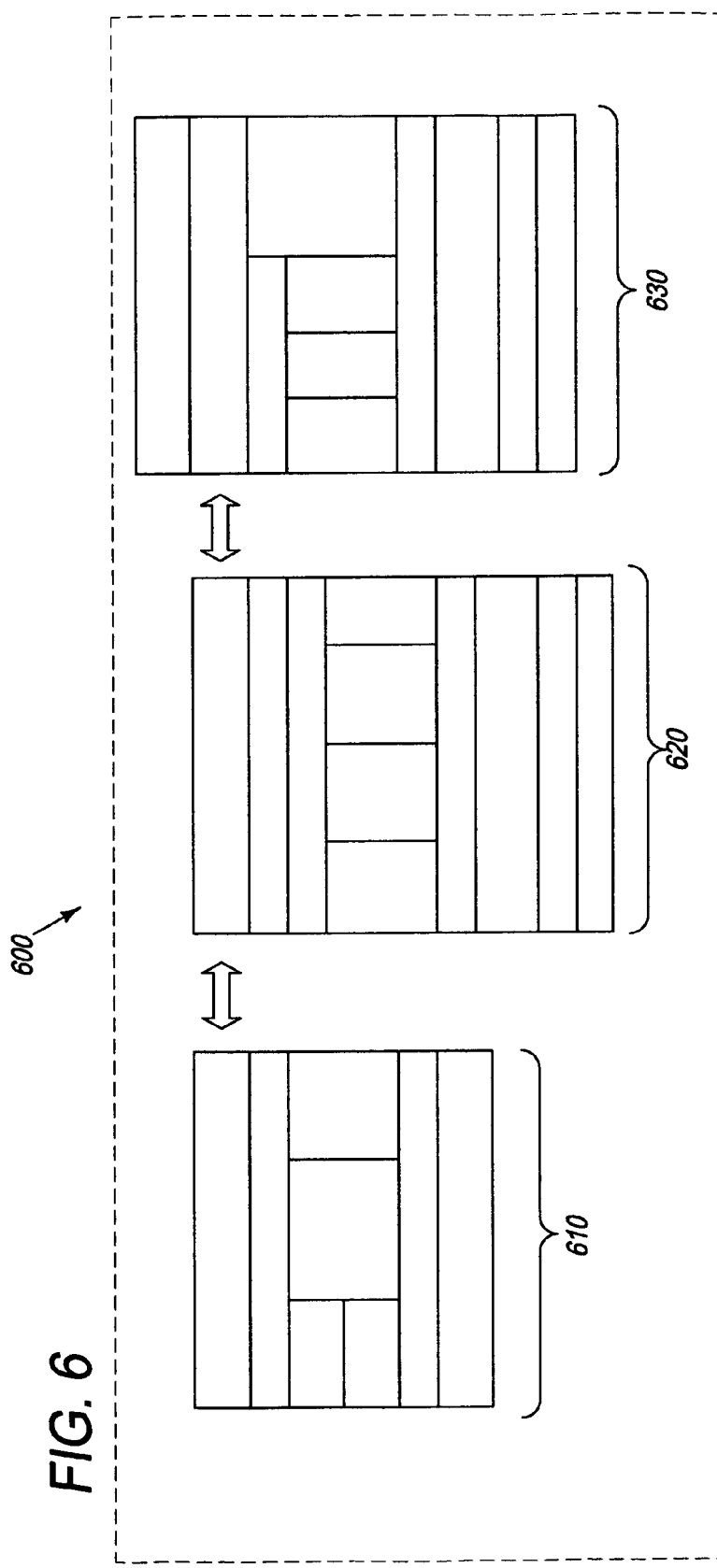
FIG. 6 is a block diagram of a first physical implementation of the software system of FIG. 5.
Figure 7:
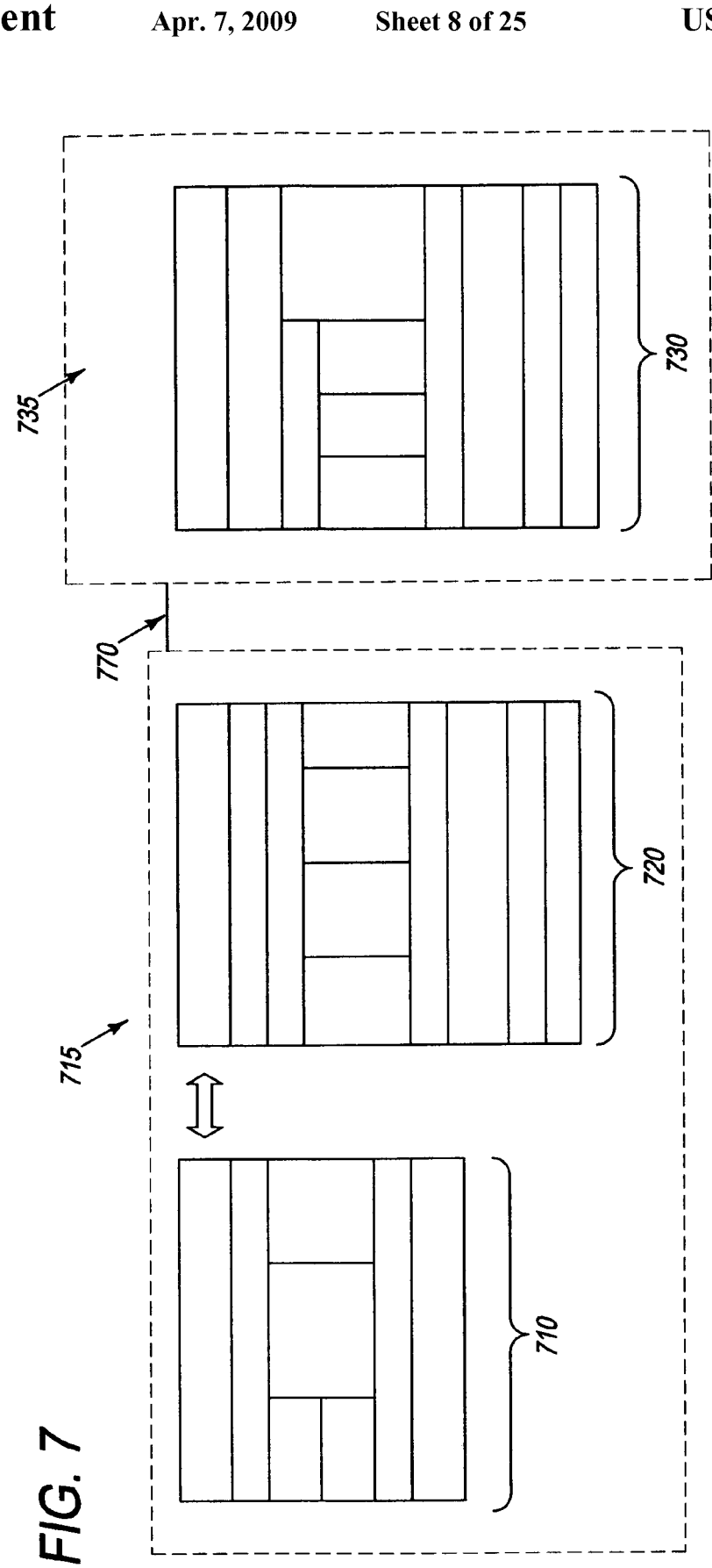
FIG. 7 is a block diagram of a second physical implementation of the software system of FIG. 5.
Figure 8:
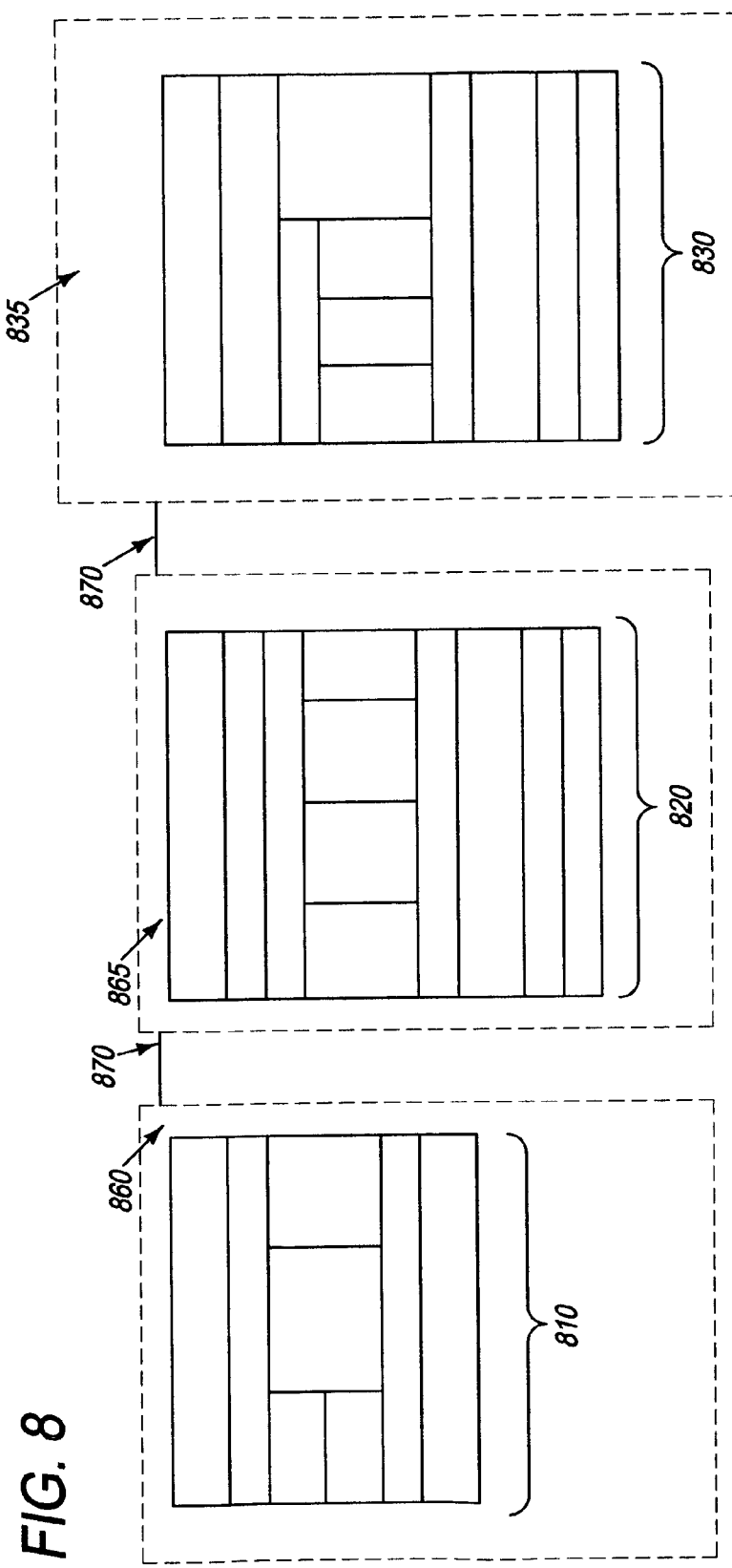
FIG. 8 is a block diagram of a third physical implementation of the software system of FIG. 5.

The logical system of FIG. 5 can be physically deployed in a number of ways, depending on processing needs, due, in part, to the novel software architecture, to be described below. As shown in FIG. 6, one physical embodiment of the software system described in FIG. 5 is to be on a single chip 600, where the media processing block 610, packetization block 620, and management block 630 are all operative on the same chip. If processing needs increase, thereby requiring more chip power be dedicated to media processing, the software system can be physically implemented such that the media processing block 710 and packetization block 720 operate on a DSP 715 that is in communication via a data bus 770 with the management block 730 that operates on a separate host processor 735, as depicted in FIG. 7. Similarly, if processing needs further increase, the media processing block 810 and packetization block 820 can be implemented on separate DSPs 860, 865 and communicate via data buses 870 with each other and with the management block 830 that operates on a separate host processor 835, as depicted in FIG. 8. Within each block, the modules can be physically separated onto different processors to enable for a high degree of system scalability.

In a preferred embodiment, four OC-3 tiles are combined onto a single integrated circuit (IC) card wherein each OC-3 tile is configured to perform media processing and packetization tasks. The IC card has four OC-3 tiles in communication via data buses. As previously described, the OC-3 tiles each have three Media Engine II processors in communication via interchip communication buses with a Packet Engine processor. The Packet Engine processor has a MAC and PHY interface by which communications external to the OC-3 tiles are performed. The PHY interface of the first OC-3 tile is in communication with the MAC interface of the second OC-3 tile. Similarly, the PHY interface of the second OC-3 file is in communication with the MAC interface of the third OC-3 tile and the PHY interface of the third OC-3 tile is in communication with the MAC interface of the fourth OC-3 tile. The MAC interface of the first OC-3 tile is in communication with the PHY interface of a host processor. Operationally, each Media Engine II processor implements the Media Processing Subsystem of the present invention, shown in FIG. 5 as 505. Each Packet Engine processor implements the Packetization Subsystem of the present invention, shown in FIG. 5 as 540. The host processor implements the Management Subsystem, shown in FIG. 5 as 570.

The primary components of the top-level hardware system architecture will now be described in further detail, including Media Engine Type I, Media Engine Type II, and Packet Engine. Additionally, the software architecture, along with specific features, will be further described in detail.

Media Engines

Both Media Engine I and Media Engine II are types of DPLPs and therefore comprise a layered architecture wherein each layer encodes and decodes up to N channels of voice, fax, modem, or other data depending on the layer configuration. Each layer implements a set of pipelined processing units specially designed through substantially optimal hardware and software partitioning to perform specific media processing functions. The processing units are special-purpose digital signal processors that are each optimized to perform a particular signal processing function or a class of functions. By creating processing units that are capable of performing a well-defined class of functions, such as echo cancellation or codec implementation, and placing them in a pipeline structure, the present invention provides a media processing system and method with substantially greater performance than conventional approaches.

Figure 9:
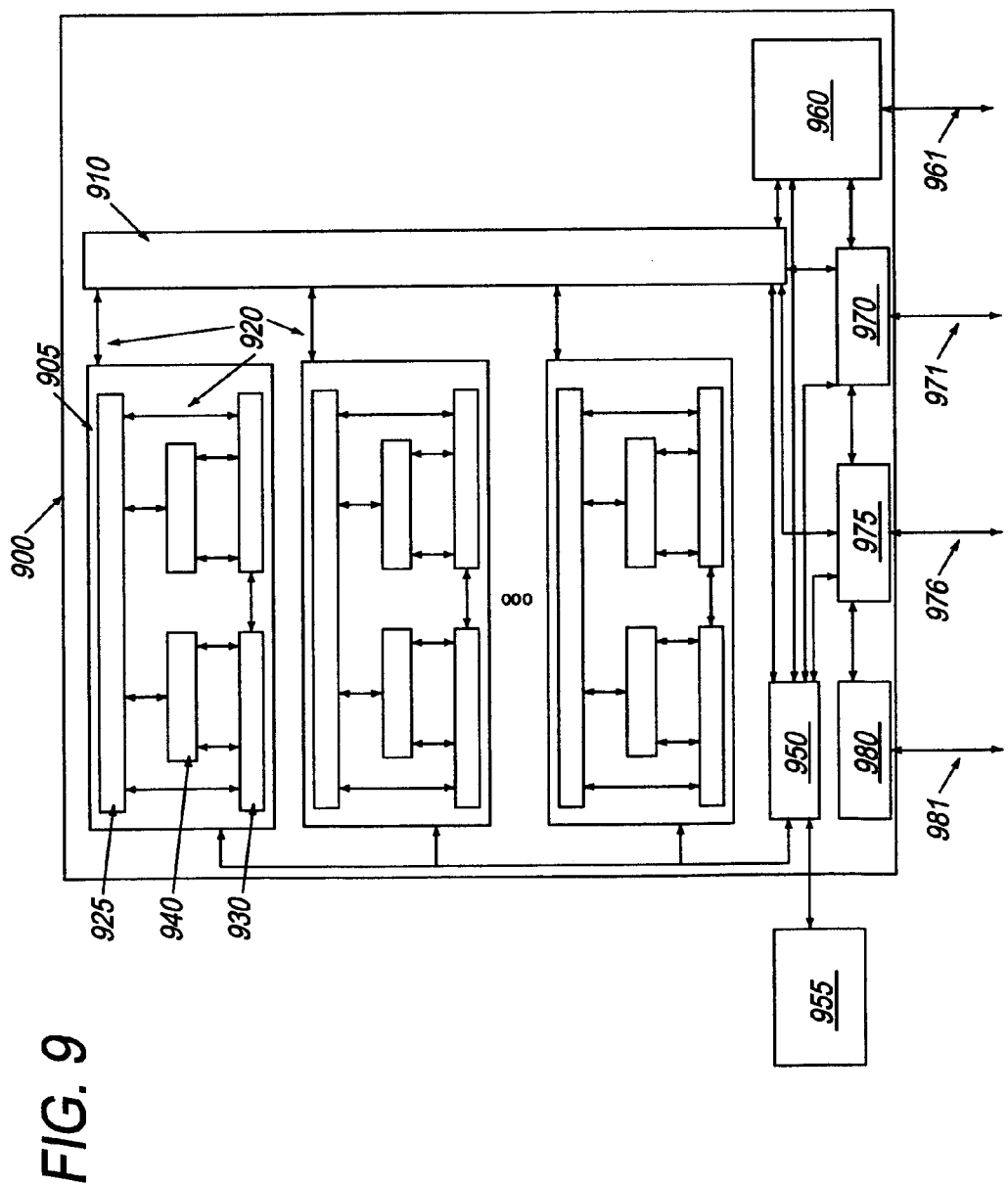
FIG. 9 is a block diagram of a first embodiment of the media engine component of the hardware system of the present invention.

Referring to FIG. 9, a diagram of Media Engine I 900 is shown. Media Engine I 900 comprises a plurality of Media Layers 905 each in communication with a central direct memory access (DMA) controller 910 via communication data buses 920. Using a DMA approach enables the bypassing of a system processing unit to handle the transfer of data between itself and system memory directly. Each Media Layer 905 further comprises an interface to the DMA 925 interconnected with the communication data buses 920. In turn, the DMA interface 925 is in communication with each of a plurality of pipelined processing units (PUs) 930 via communication data buses 920 and a plurality of program and data memories 940, via communication data buses 920, that are situated between the DMA interface 925 and each of the PUs 930. The program and data memories 940 are also in communication with each of the PUs 930 via data buses 920. Preferably, each PU 930 can access at least one program memory and at least one data memory unit 940. Further, it is also preferred to have at least one first-in, first-out (FIFO) task queue [not shown] to receive scheduled tasks and queue them for operation by the PUs 930.

While the layered architecture of the present invention is not limited to a specific number of Media Layers, certain practical limitations may restrict the number of Media Layers that can be stacked into a single Media Engine I. As the number of Media Layers increase, the memory and device input/output bandwidth may increase to such an extent that the memory requirements, pin count, density, and power consumption are adversely affected and become incompatible with application or economic requirements. Those practical limitations, however, do not represent restrictions on the scope and substance of the present invention.

Media Layers 905 are in communication with an interface to the central processing unit 950 (CPU IF) through communication buses 920. The CPU IF 950 transmits and receives control signals and data from an external scheduler 955, the DMA controller 910, a PCI interface (PCI IF) 960, a SRAM interface (SRAM IF) 975, and an interface to an external memory, such as an SDRAM interface (SDRAM IF) 970 through communication buses 920. The PCI IF 960 is preferably used for control signals. The SDRAM IF 970 connects to a synchronized dynamic random access memory module whereby the memory access cycles are synchronized with the CPU clock in order to eliminate wait time associated with memory fetching between random access memory (RAM)

and the CPU. In a preferred embodiment, the SDRAM IF 970 that connects the processor with the SDRAM supports 133 MHz synchronous DRAM and asynchronous memory. It supports one bank of SDRAM (64 Mbit/256 Mbit to 256 MB maximum) and 4 asynchronous devices (8/16/32 bit) with a data path of 32 bits and fixed length as well as undefined length block transfers and accommodates back-to-back transfers. Eight transactions may be queued for operation. The SDRAM [not shown] contains the states of the PUs 930. One of ordinary skill in the art would appreciate that, although not preferred, other external memory configurations and types could be selected in place of the SDRAM and, therefore, that another type of memory interface could be used in place of the SDRAM IF 970.

The SDRAM IF 970 is further in communication with the PCI IF 960, DMA controller 910, the CPU IF 950, and, preferably, the SRAM interface (SRAM IF) 975 through communication buses 920. The SRAM [not shown] is a static random access memory that is a form of random access memory that retains data without constant refreshing, offering relatively fast memory access. The SRAM IF 975 is also in communication with a TDM interface (TDM IF) 980, the CPU IF 950, the DMA controller 910, and the PCI IF 960 via data buses 920.

In a preferred embodiment, the TDM IF 980 for the trunk side is preferably H.100/H.110 compatible and the TDM bus 981 operates at 8.192 MHz. Enabling the Media Engine I 900 to provide 8 data signals, therefore delivering a capacity up to 512 full duplex channels, the TDM IF 980 has the following preferred features: a H.100/H.110 compatible slave, frame size can be set to 16 or 20 samples and the scheduler can program the TDM IF 980 to store a specific buffer or frame size, programmable staggering points for the maximum number of channels. Preferably, the TDM IF interrupts the scheduler after every N samples of 8,000 Hz clock with the number N being programmable with possible values of 2, 4, 6, and 8. In a voice application, the TDM IF 980 preferably does not transfer the pulse code modulation (PCM) data to memory on a sample-by-sample basis, but rather buffers 16 or 20 samples, depending on the frame size that the encoders and decoders are using, of a channel and then transfers the voice data for that channel to memory.

The PCI IF 960 is also in communication with the DMA controller 910 via communication buses 920. External connections comprise connections between the TDM IF 980 and a TDM bus 981, between the SRAM IF 975 and a SRAM bus 976, between the SDRAM IF 970 and a SDRAM bus 971, preferably operating at 32 bit@133 MHz, and between the PCI IF 960 and a PCI 2.1 Bus 961 also preferably operating at 32 bit@133 MHz.

External to Media Engine I, the scheduler 955 maps the channels to the Media Layers 905 for processing. When the scheduler 955 is processing a new channel, it assigns the channel to one of the layers, depending upon processing resources available per layer 905. Each layer 905 handles the processing of a plurality of channels such that the processing is performed in parallel and is divided into fixed frames, or portions of data. The scheduler 955 communicates with each Media Layer 905 through the transmission of data, in the form of tasks, to the FIFO task queues wherein each task is a request to the Media Layer 905 to process a plurality of data portions for a particular channel. It is therefore preferred for the scheduler 955 to initiate the processing of data from a channel by putting a task in a task queue, rather than programming each PU 930 individually. More specifically, it is preferred to have the scheduler 955 initiate the processing of data from a channel by putting a task in the task queue of a particular PU 930 and having the Media Layer's 905 pipeline architecture manage the data flow to subsequent PUs 930.

The scheduler 955 should manage the rate by which each of the channels is processed. In an embodiment where the Media Layer 905 is required to accept the processing of data from M channels and each of the channels uses a frame size of T msec, then it is preferred that the scheduler 955 processes one frame of each of the M channels within each T msec interval. Further, in a preferred embodiment, the scheduling is based upon periodic interrupts, in the form of units of samples, from the TDM IF 980. As an example, if the interrupt period is two samples then it is preferred that the TDM IF 980 interrupts the scheduler every time it gathers two new samples of all channels. The scheduler preferably maintains a "tick-count", which is incremented on every interrupt and reset to zero when time equal to a frame size has passed. The mapping of channels to time slots is preferably not fixed. For example, in voice applications, whenever a call starts on a channel, the scheduler dynamically assigns a layer to a provisioned time slot channel. It is further preferred that the data transfer from a TDM buffer to the memory is aligned with the time slot in which this data is processed, thereby staggering the data transfer for different channels from TDM to memory, and vice-versa, in a manner that is equivalent to the staggering of the processing of different channels. Consequently, it is further preferred that the TDM IF 980 maintains a tick count variable wherein there is some synchronization between the tick counts of TDM and scheduler 955. In the exemplary embodiment described above, the tick count variable is set to zero on every 2 ms or 2.5 ms depending on the buffer size.

Figure 10:
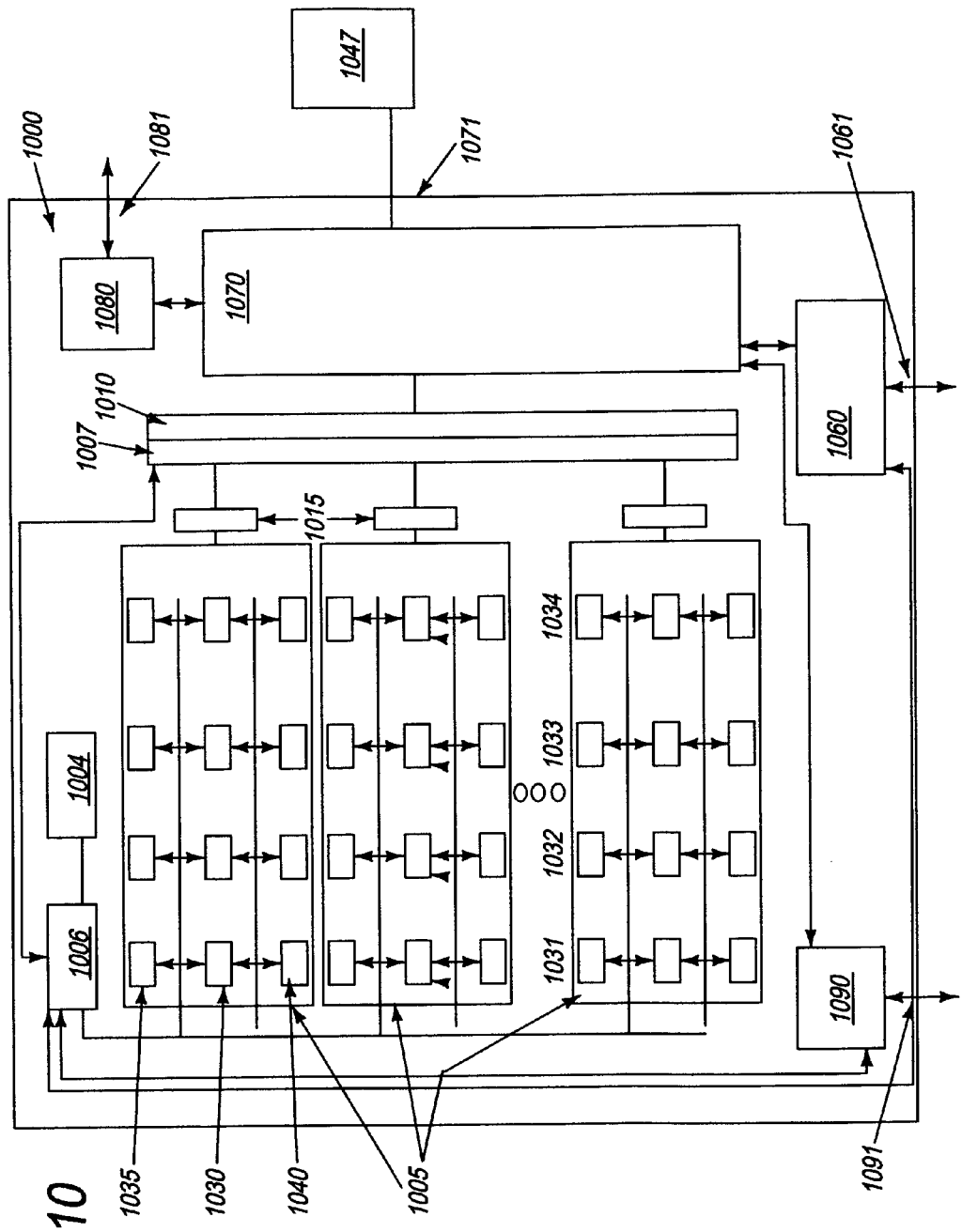
FIG. 10 is a block diagram of a preferred embodiment of the media engine component of the hardware system of the present invention.

Referring to FIG. 10, a block diagram of Media Engine II 1000 is shown. Media Engine II 1000 comprises a plurality of Media Layers 1005 each in communication with processing layer controller 1007, referred to herein as a Media Layer Controller 1007, and central direct memory access (DMA) controller 1010 via communication data buses and an interface 1015. Each Media Layer 1005 is in communication with a CPU interface 1006 that, in turn, is in communication with a CPU 1004. Within each Media Layer 1005, a plurality of pipelined processing units (PUs) 1030 are in communication with a plurality of program memories 1035 and data memories 1040, via communication data buses. Preferably, each PU 1030 can access at least one program memory 1035 and one data memory 1040. Each of the PUs 1030, program memories 1035, and data memories 1040 is in communication with an external memory 1047 via the Media Layer Controller 1007 and DMA 1010. In a preferred embodiment, each Media Layer 1005 comprises four PUs 1030, each of which is in communication with a single program memory 1035 and data memory 1040, wherein the each of the PUs 1031, 1032, 1033, 1034 is in communication with each of the other PUs 1031, 1032, 1033, 1034 in the Media Layer 1005.

Figure 10A:
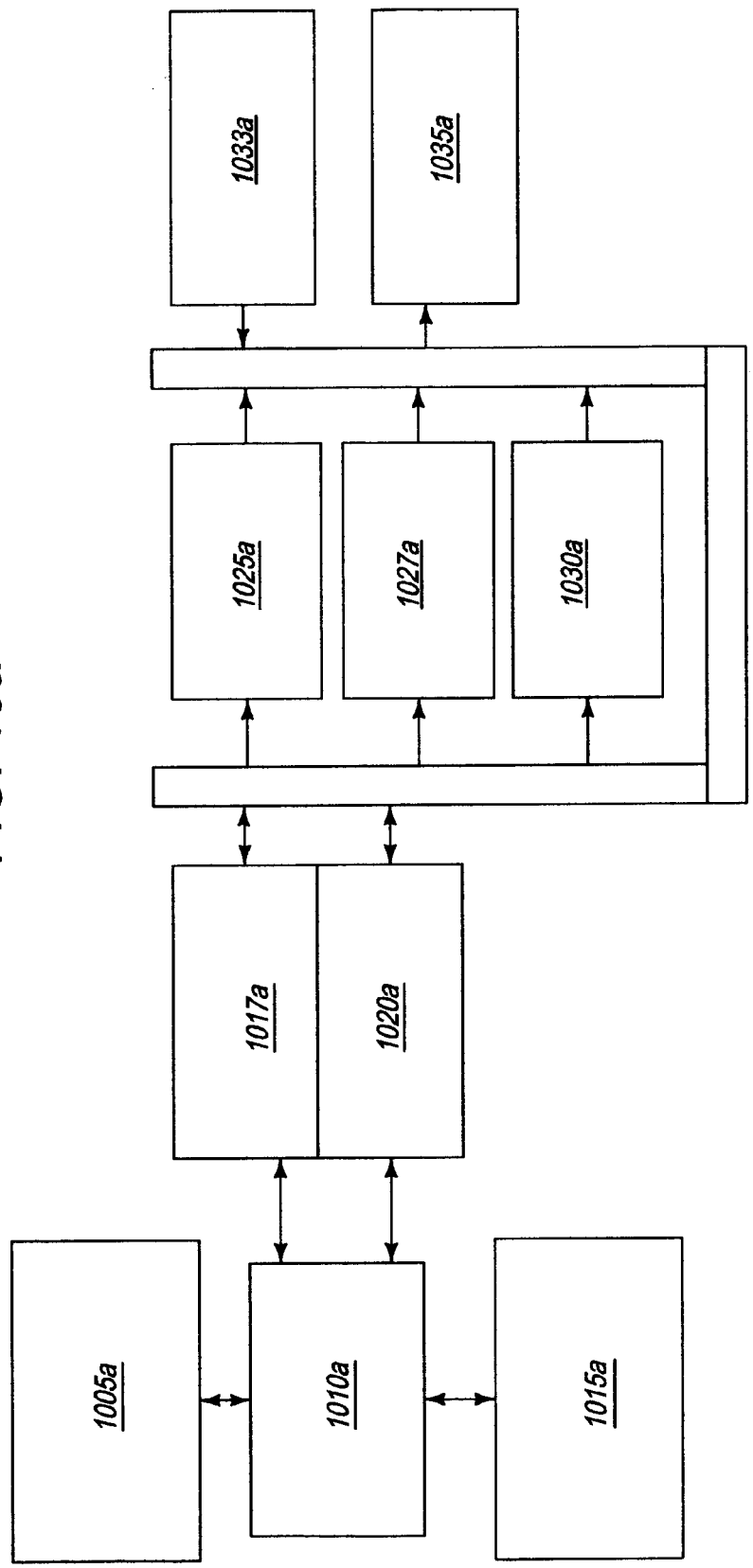
FIG. 10a is a block diagram representation of a preferred architecture for the media layer component of the media engine of FIG. 10.

Shown in FIG. 10a, a preferred embodiment of the architecture of the Media Layer Controller, or MLC, is provided. A program memory 1005a, preferably 512×64, operates in conjunction with a controller 1010a and data memory 1015a to deliver data and instructions to a data register file 1017a, preferably 16×32, and address register file 1020a, preferably 4×12. The data register file 1017a and address register file 1020a are in communication with functional units such as an adder/MAC 1025a, logical unit 1027a, and barrel shifter 1030a and with units such as a request arbitration logic unit 1033a and DMA channel bank 1035a.

Referring back to FIG. 10, the MLC 1007 arbitrates data and program code transfer requests to and from the program memories 1035 and data memories 1040 in a round robin fashion. On the basis of this arbitration the MLC 1007 fills the data pathways that define how units directly access memory, namely the DMA channels [not shown]. The MLC 1007 is capable of performing instruction decoding to route an instruction according to its dataflow and keep track of the request states for all PUs 1030, such as the state of a read-in request, a write-back request and an instruction forwarding. The MLC 1007 is further capable of conducting interface related functions, such as programming DMA channels, starting signal generation, maintaining page states for PUs 1030 in each Media Layer 1005, decoding of scheduler instructions, and managing the movement of data from and into the task queues of each PU 1030. By performing the aforementioned functions, the Media Layer Controller 1007 substantially eliminates the need for associating complex state machines with the PUs 1030 present in each Media Layer 1005.

The DMA controller 1010 is a multi-channel DMA unit for handling the data transfers between the local memory buffer PUs and external memories, such as the SDRAM. Preferably, DMA channels are programmed dynamically. More specifically, PUs 1030 generate independent requests, each having an associated priority level, and send them to the MLC 1007 for reading or writing. Based upon the priority request delivered by a particular PU 1030, the MLC 1007 programs the DMA channel accordingly. Preferably, there is also an arbitration process, such as a single level of round robin arbitration, between the channels within the DMA to access the external memory. The DMA Controller 1010 provides hardware support for round robin request arbitration across the PUs 1030 and Media Layers 1005.

In an exemplary operation, it is preferred to conduct transfers between local PU memories and external memories by utilizing the address of the local memory, address of the external memory, size of the transfer, direction of the transfer, namely whether the DMA channel is transferring data to the local memory from the external memory or vice-versa, and how many transfers are required for each PU. In this preferred embodiment, a DMA channel is generated and receives this information from two 32-bit registers residing in the DMA. A third register exchanges control information between the DMA and each PU that contains the current status of the DMA transfer. In a preferred embodiment, arbitration is performed among the following requests: 1 structure read, 4 data read and 4 data write requests from each Media Layer, approximately 90 data requests in total, and 4 program code fetch requests from each Media Layer, approximately 40 program code fetch requests in total. The DMA Controller 1010 is preferably further capable of arbitrating priority for program code fetch requests, conducting link list traversal and DMA channel information generation, and performing DMA channel prefetch and done signal generation.

The MLC 1007 and DMA Controller 1010 are in communication with a CPU IF 1006 through communication buses. The PCI IF 1060 is in communication with an external memory interface (such as a SDRAM IF) 1070 and with the CPU IF 1006 via communication buses. The external memory interface 1070 is further in communication with the MLC 1007 and DMA Controller 1010 and a TDM IF 1080 through communication buses. The SDRAM IF 1070 is in communication with a packet processor interface, such as a UTOPIA II/POS compatible interface (U2/POS IF), 1090 via communication data buses. The U2/POS IF 1090 is also preferably in communication with the CPU IF 1006. Although the preferred embodiments of the PCI IF and SDRAM IF are similar to Media Engine I, it is preferred that the IDM IF 1080 have all 32 serial data signals implemented, thereby supporting at least 2048 full duplex channels. External connections comprise connections between the TDM IF 1080 and a TDM bus 1081, between the external memory 1070 and a memory bus 1071, preferably operating at 64 bit at 133 MHz, between the PCI IF 1060 and a PCI 2.1 Bus 1061 also preferably operating at 32 bit at 133 MHz, and between the U2/POS IF 1090 and a UTOPIA II/POS connection 1091 preferably operative at 622 megabits per second. In a preferred embodiment, the TDM IF 1080 for the trunk side is preferably H.100/H.110 compatible and the TDM bus 1081 operates at 8.192 MHz, as previously discussed in relation to the Media Engine I.

For both Media Engine I and Media Engine II, within each media layer, the present invention utilizes a plurality of pipelined PUs specially designed for conducting a defined set of processing tasks. In that regard, the PUs are not general-purpose processors and cannot be used to conduct any processing task. A survey and analysis of specific processing tasks yielded certain functional unit commonalities that, when combined, yield a specialized PU capable of optimally processing the universe of those specialized processing tasks. The instruction set architecture of each PU yields compact code. Increased code density results in a decrease in required memory and, consequently, a decrease in required area, power, and memory traffic.

The pipeline architecture also improves performance. Pipelining is an implementation technique whereby multiple instructions are overlapped in execution. In a computer pipeline, each step in the pipeline completes a part of an instruction. Like an assembly line, different steps are completing different parts of different instructions in parallel. Each of these steps is called a pipe stage or a data segment. The stages are connected on to the next to form a pipe. Within a processor, instructions enter the pipe at one end, progress through the stages, and exit at the other end. The throughput of an instruction pipeline is determined by how often an instruction exits the pipeline.

More specifically, one type of PU (referred to herein as EC PU) has been specially designed to perform, in a pipeline architecture, a plurality of media processing functions, such as echo cancellation (EC), voice activity detection (VAD), and tone signaling (TS) functions. Echo cancellation removes from a signal echoes that may arise as a result of the reflection and/or retransmission of modified input signals back to the originator of the input signals. Commonly, echoes occur when signals that were emitted from a loudspeaker are then received and retransmitted through a microphone (acoustic echo) or when reflections of a far end signal are generated in the course of transmission along hybrids wires (line echo). Although undesirable, echo is tolerable in a telephone system, provided that the time delay in the echo path is relatively short; however, longer echo delays can be distracting or confusing to a far end speaker. Voice activity detection determines whether a meaningful signal or noise is present at the input. Tone signaling comprises the processing of supervisory, address, and alerting signals over a circuit or network by means of tones. Supervising signals monitor the status of a line or circuit to determine if it is busy, idle, or requesting service. Alerting signals indicate the arrival of an incoming call. Addressing signals comprise routing and destination information.

The LEC, VAD, and TS functions can be efficiently executed using a PU having several single-cycle multiply and accumulate (MAC) units operating with an Address Generation Unit and an Instruction Decoder. Each MAC unit includes a compressor, sum and carry registers, an adder, and a saturation and rounding logic unit. In a preferred embodiment, shown in FIG. 11, this PU 1100 comprises a load store architecture with a single Address Generation Unit (AGU) 1105, supporting zero over-head looping and branching with delay slots, and an Instruction Decoder 1106. The plurality of MAC units 1110 operate in parallel on two 16-bit operands and perform the following function:

$$Acc\mathrel{+}=a*b$$

Guard bits are appended with sum and carry registers to facilitate repeated MAC operations. A scale unit prevents accumulator overflow. Each MAC unit 1110 may be programmed to perform round operations automatically. Additionally, it is preferred to have an addition/subtraction unit [not shown] as a conditional sum adder with both the input operands being 20 bit values and the output operand being a 16-bit value.

Operationally, the EC PU performs tasks in a pipeline fashion. A first pipeline stage comprises an instruction fetch wherein instructions are fetched into an instruction register from program memory. A second pipeline stage comprises an instruction decode and operand fetch wherein an instruction is decoded and stored in a decode register. The hardware loop machine is initialized in this cycle. Operands from the data register files are stored in operand registers. The AGU operates during this cycle. The address is placed on data memory address bus. In the case of a store operation, data is also placed on the data memory data bus. For post increment or decrement instructions, the address is incremented or decremented after being placed on the address bus. The result is written back to address register file. The third pipeline stage, the Execute stage, comprises the operation on the fetched operands by the Addition/Subtraction Unit and MAC units. The status register is updated and the computed result or data loaded from memory is stored in the data/address register files. The states and history information required for the EC PU operations are fetched through a multi-channel DMA interface, as previously shown in each Media Layer. The EC PU configures the DMA controller registers directly. The EC PU loads the DMA chain pointer with the memory location of the head of the chain link.

By enabling different data streams to move through the pipelined stages concurrently, the EC PU reduces wait time for processing incoming media, such as voice. Referring to FIG. 12, in time slot 1 1205, an instruction fetch task (IF) is performed for processing data from channel 1 1250. In time slot 2 1206, the IF task is performed for processing data from channel 2 1255 while, concurrently, an instruction decode and operand fetch (IDOF) is performed for processing data from channel 1 1250. In time slot 3 1207, an IF task is performed for processing data from channel 3 1260 while, concurrently, an instruction decode and operand fetch (IDOF) is performed for processing data from channel 2 1255 and an Execute (EX) task is performed for processing data from channel 1 1250. One of ordinary skill in the art would appreciate that, because channels are dynamically generated, the channel numbering may not reflect the actual location and assignment of a task. Channel numbering here is used to simply indicate the concept of pipelining across multiple channels and not to represent actual task locations.

A second type of PU (referred to herein as CODEC PU) has been specially designed to perform, in a pipeline architecture, a plurality of media processing functions, such as encoding and decoding signals in accordance with certain standards and protocols, including standards promoted by the International Telecommunication Union (ITU) such as voice standards, including G.711, G.723.1, G.726, G.728, G.729A/B/E, and data modem standards, including V.17, V.34, and V.90, among others (referred to herein as Codecs), and performing comfort noise generation (CNG) and discontinuous transmission (DTX) functions. The various Codecs are used to encode and decode voice signals with differing degrees of complexity and resulting quality. CNG is the generation of background noise that gives users a sense that the connection is live and not broken. A DTX function is implemented when the frame being received comprises silence, rather than a voice transmission.

Figure 13:
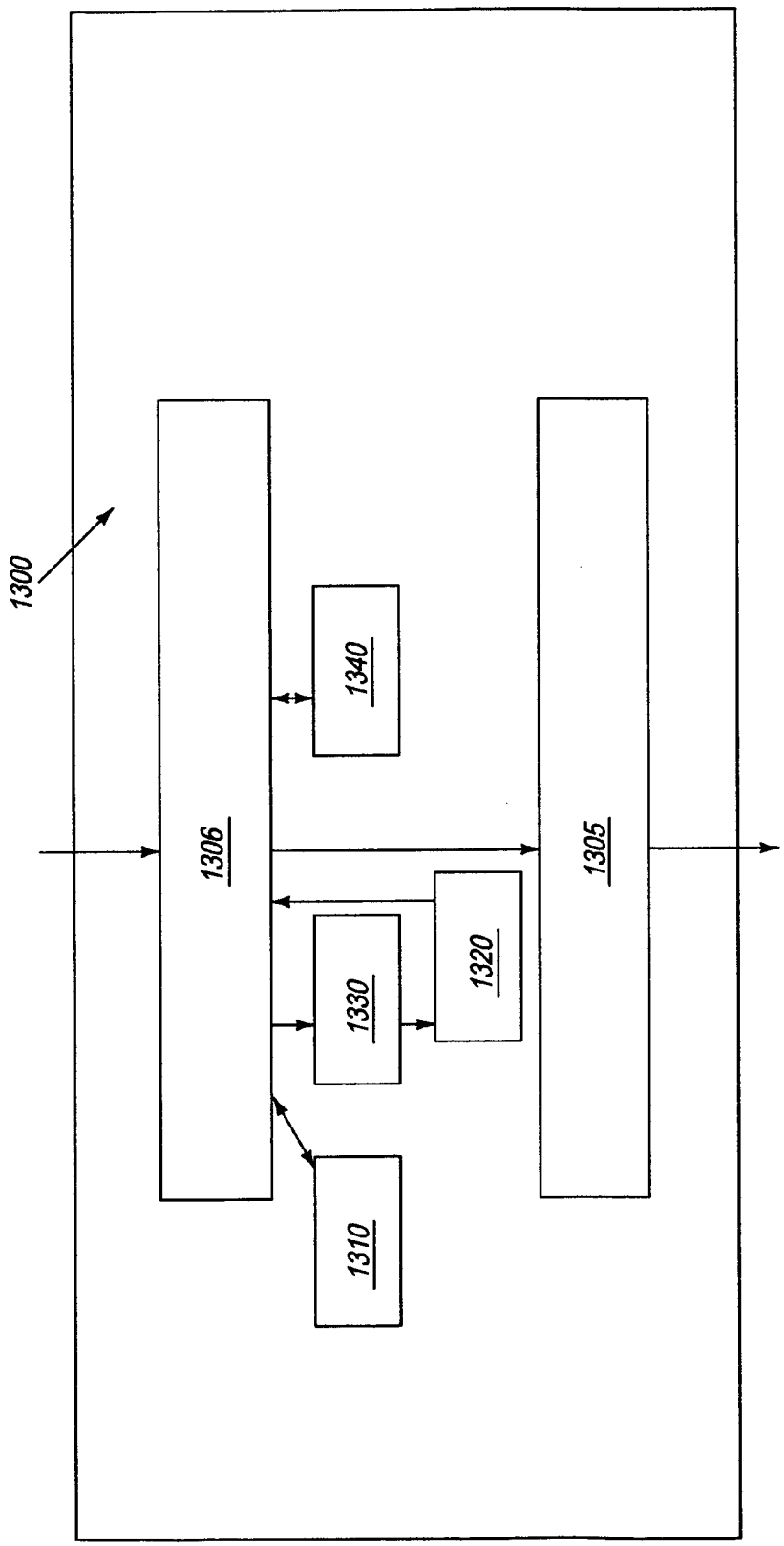
FIG. 13 is a block diagram representation of a second preferred processing unit.

The Codecs, CNG, and DTX functions can be efficiently executed using a PU having an Arithmetic and Logic Unit (ALU), MAC unit, Barrel Shifter, and Normalization Unit. In a preferred embodiment, shown in FIG. 13, the CODEC PU 1300 comprises a load store architecture with a single Address Generation Unit (AGU) 1305, supporting zero overhead looping and zero overhead branching with delay slots, and an Instruction Decoder 1306.

In an exemplary embodiment, each MAC unit 1310 includes a compressor, sum and carry registers, an adder, and a saturation and rounding logic unit. The MAC unit 1310 is implemented as a compressor with feedback into the compression tree for accumulation. One preferred embodiment of a MAC 1310 has a latency of approximately 2 cycles with a throughput of 1 cycle. The MAC 1310 operates on two 17-bit operands, signed or unsigned. The intermediate results are kept in sum and carry registers. Guard bits are appended to the sum and carry registers for repeated MAC operations. The saturation logic converts the Sum and Carry results to 32 bit values. The rounding logic rounds a 32 bit to a 16-bit number. Division logic is also implemented in the MAC unit 1310.

In an exemplary embodiment, the ALU 1320 includes a 32 bit adder and a 32 bit logic circuit capable of performing a plurality of operations, including add, add with carry, subtract, subtract with borrow, negate, AND, OR, XOR, and NOT. One of the inputs to the ALU 1320 has an XOR array, which operates on 32-bit operands. Comprising an absolute unit, a logic unit, and an addition/subtraction unit, the ALU's 1320 absolute unit drives this array. Depending on the output of the absolute unit, the input operand is either XORed with one or zero to perform negation on the input operands.

In an exemplary embodiment, the Barrel Shifter 1330 is placed in series with the ALU 1320 and acts as a pre-shifter to operands requiring a shift operation followed by any ALU operations. One type of preferred Barrel Shifter can perform a maximum of 9-bit left or 26-bit right arithmetic shifts on 16-bit or 32-bit operands. The output of the Barrel Shifter is a 32-bit value, which is accessible to both the inputs of the ALU 1320.

In an exemplary embodiment, the Normalization unit 1340 counts the redundant sign bits in the number. It operates on 2's complement 16-bit numbers. Negative numbers are inverted to compute the redundant sign bits. The number to be normalized is fed into the XOR array. The other input comes from the sign bit of the number. Where the media being processed is voice, it is preferred to have an interface to the EC PU. The EC PU uses VAD to determine whether a frame being received comprises silence or speech. The VAD decision is preferably communicated to the CODEC PU so that it may determine whether to implement a Codec or DTX function.

Operationally, the CODEC PU performs tasks in a pipeline fashion. A first pipeline stage comprises an instruction fetch wherein instructions are fetched into an instruction register from program memory. At the same time, the next program counter value is computed and stored in the program counter. In addition, loop and branch decisions are taken in the same cycle. A second pipeline stage comprises an instruction decode and operand fetch wherein an instruction is decoded and stored in a decode register. The instruction decode, register read and branch decisions happen in the instruction decode stage. In the third pipeline stage, the Execute 1 stage, the Barrel Shifter and the MAC compressor tree complete their computation. Addresses to data memory are also applied in this stage. In the fourth pipeline stage, the Execute 2 stage, the ALU, normalization unit, and the MAC adder complete their computation. Register write-back and address registers are updated at the end of the Execute-2 stage. The states and history information required for the CODEC PU operations are fetched through a multi-channel DMA interface, as previously shown in each Media Layer.

Figure 13A:
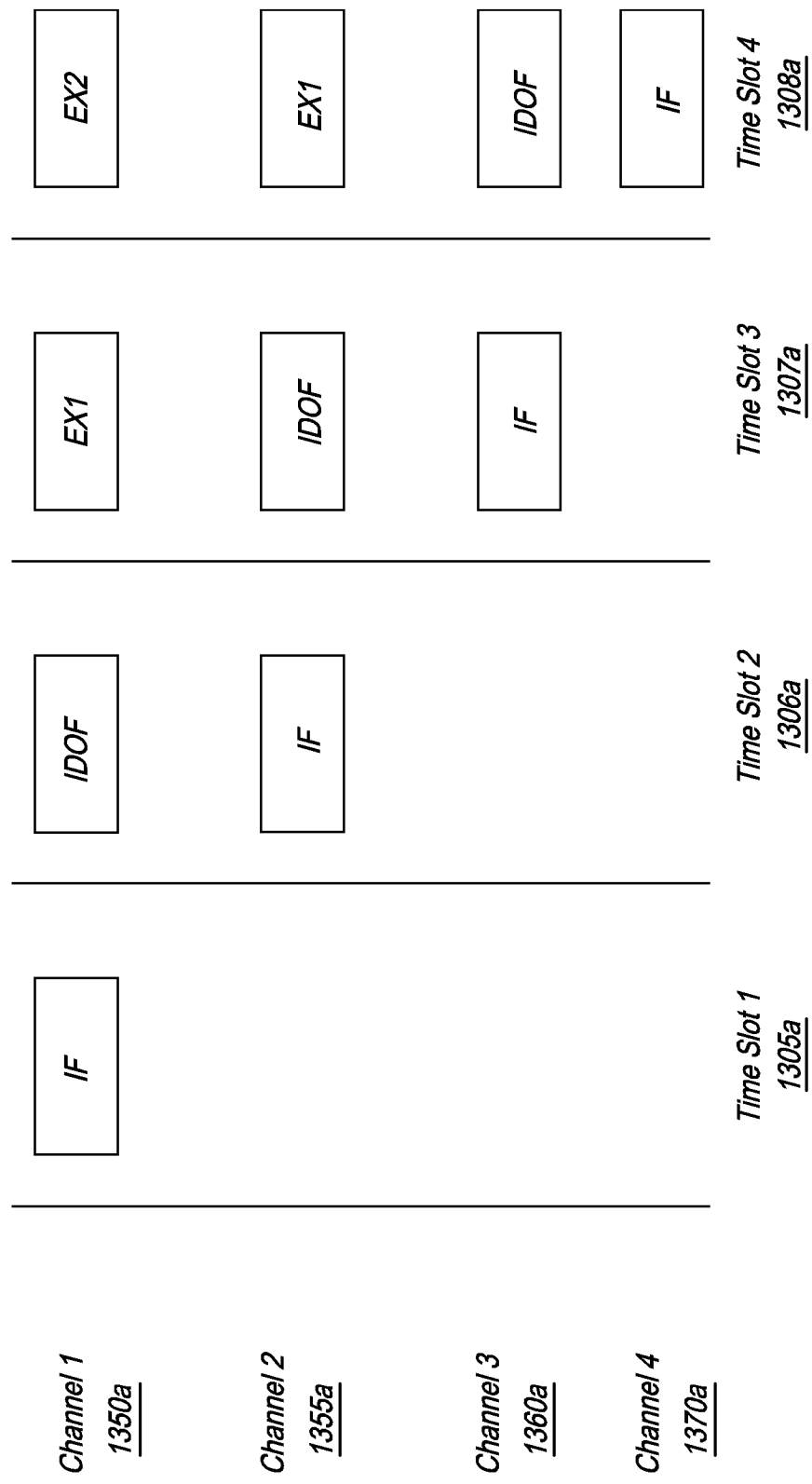
FIG. 13a is a time-based schematic of the pipeline processing conducted by the second preferred processing unit.

By enabling different data streams to move through the pipelined stages concurrently, the CODEC PU reduces wait time for processing incoming media, such as voice. Referring to FIG. 13a, in time slot 1 1305a, an instruction fetch task (IF) is performed for processing data from channel 1 1350a. In time slot 2 1306a, the IF task is performed for processing data from channel 2 1355a while, concurrently, an instruction decode and operand fetch (IDOF) is performed for processing data from channel 1 1350a. In time slot 3 1307a, an IF task is performed for processing data from channel 3 1360a while, concurrently, an instruction decode and operand fetch (IDOF) is performed for processing data from channel 2 1355a and an Execute 1 (EX1) task is performed for processing data from channel 1 1350a. In time slot 4 1308a, an IF task is performed for processing data from channel 4 1370a while, concurrently, an induction decode and operand fetch (IDOF) is performed for processing data from channel 3 1360a, an Execute 1 (EX1) task is performed for processing data from channel 2 1355a, and an Execute 2 (EX2) task is performed for processing data from channel 1 1350a. One of ordinary skill in the art would appreciate that, because channels are dynamically generated, the channel numbering may not reflect the actual location and assignment of a task. Channel numbering here is used to simply indicate the concept of pipelining across multiple channels and not to represent actual task locations.

Figure 13B:
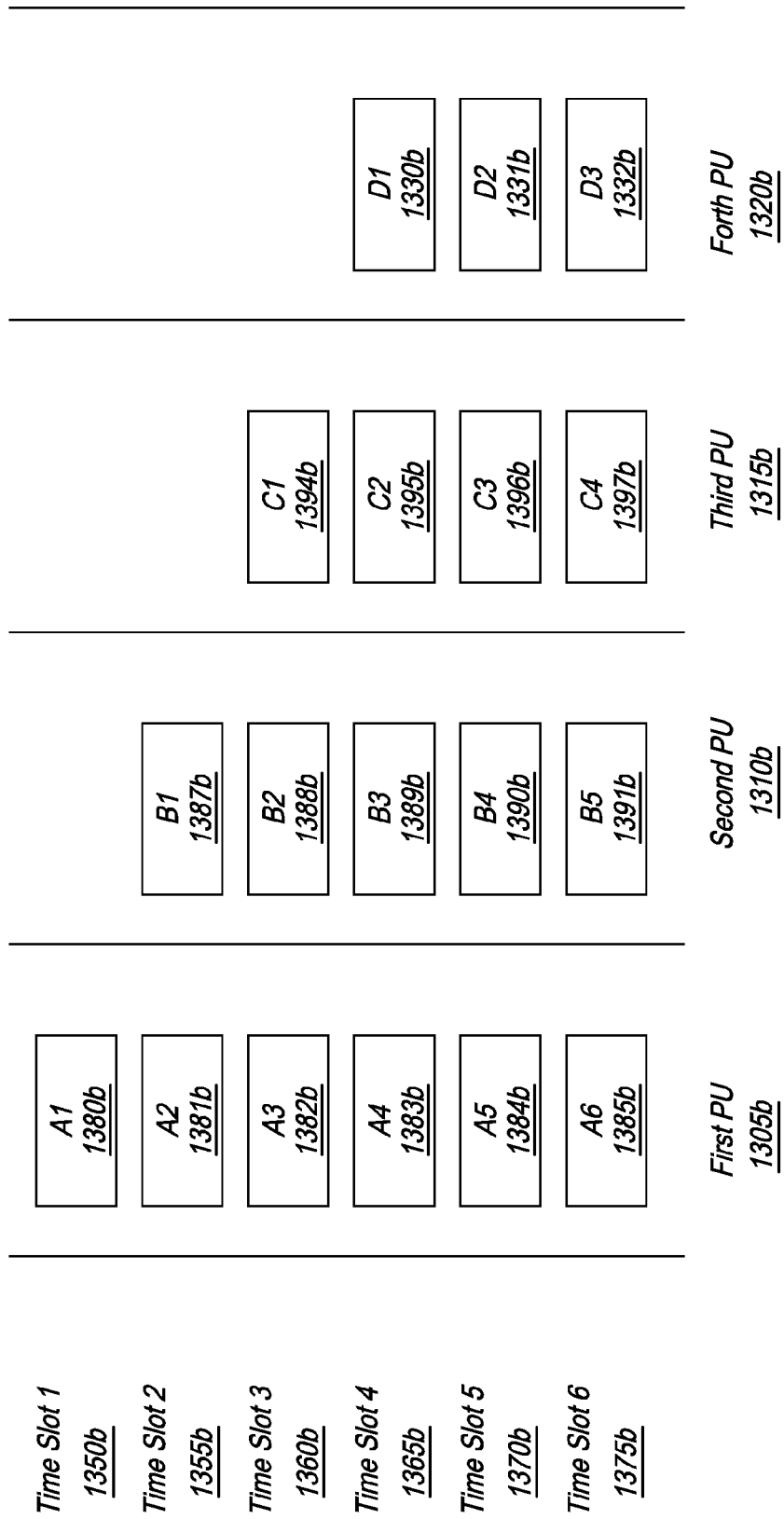
FIG. 13b is another view of a time-based schematic of the pipeline processing conducted by the second preferred processing unit.

The pipeline architecture of the present invention is not limited to instruction processing within PUs, but also exists on a PU-to-PU architecture level. As shown in FIG. 13b, multiple PUs may operate on a data set N in a pipeline fashion to complete the processing of a plurality of tasks where each task comprises a plurality of steps. A first PU 1305b may be capable of performing echo cancellation functions, labeled task A. A second PU 1310b may be capable of performing tone signaling functions, labeled task B. A third PU 1315b may be capable of performing a first set of encoding functions, labeled task C. A fourth PU 1320b may be capable of performing a second set of encoding functions, labeled task D. In time slot 1 1350b, the first PU 1305b performs task A1 1380b on data set N. In time slot 2 1355b, the first PU 1305b performs task A2 1381b on data set N and the second PU 1310b performs task B1 1387b on data set N. In time slot 3 1360b, the first PU 1305b performs task A3 1382b on data set N, the second PU 1310b performs task B2 1388b on data set N, and the third PU 1315b performs task C1 1394b on data set N.

In time slot 4 1365b, the first PU 1305b performs task A4 1383b on data set N, the second PU 1310b performs task B3 1389b on data set N, the third PU 1315b performs task C2 1395b on data set N, and the fourth PU 1320b performs task D1 1330b on data set N. In time slot 5 1370b, the first PU 1305b performs task A5 1384b on data set N, the second PU 1310b performs task B4 1390b on data set N, the third PU 1315b performs task C3 1396b on data set N, and the fourth PU 1320b performs task D2 1331b on data set N. In time slot 6 1375b, the first PU 1305b performs task A5 1385b on data set N, the second PU 1310b performs task B4 1391b on data set N, the third PU 1315b performs task C3 1397b on data set N, and the fourth PU 1320b performs task D2 1332b on data set N. One of ordinary skill in the art would appreciate how the pipeline processing would further progress.

In this exemplary embodiment, the combination of specialized PUs with a pipeline architecture enables the processing of greater channels on a single media layer.

Where each channel implements a G.711 codec and 128 ms of echo tail cancellation with Dual Tone Multi-Frequency (DTMF) detection/generation, voice activity detection (VAD), comfort noise generation (CNG), and call discrimination, the media engine layer operates at 1.95 MHz per channel.

The resulting channel power consumption is at or about 6 mW per channel using 0.13 μ standard cell technology.

Packet Engine

The Packet Engine of the present invention is a communications processor that, in a preferred embodiment, supports the plurality of interfaces and protocols used in media gateway processing systems between circuit-switched networks, packet-based IP networks, and cell-based ATM networks. The Packet Engine comprises a unique architecture capable of providing a plurality of functions for enabling media processing, including, but not limited to, cell and packet encapsulation, quality of service functions for traffic management and tagging for the delivery of other services and multi-protocol label switching, and the ability to bridge cell and packet networks.

Figure 14:
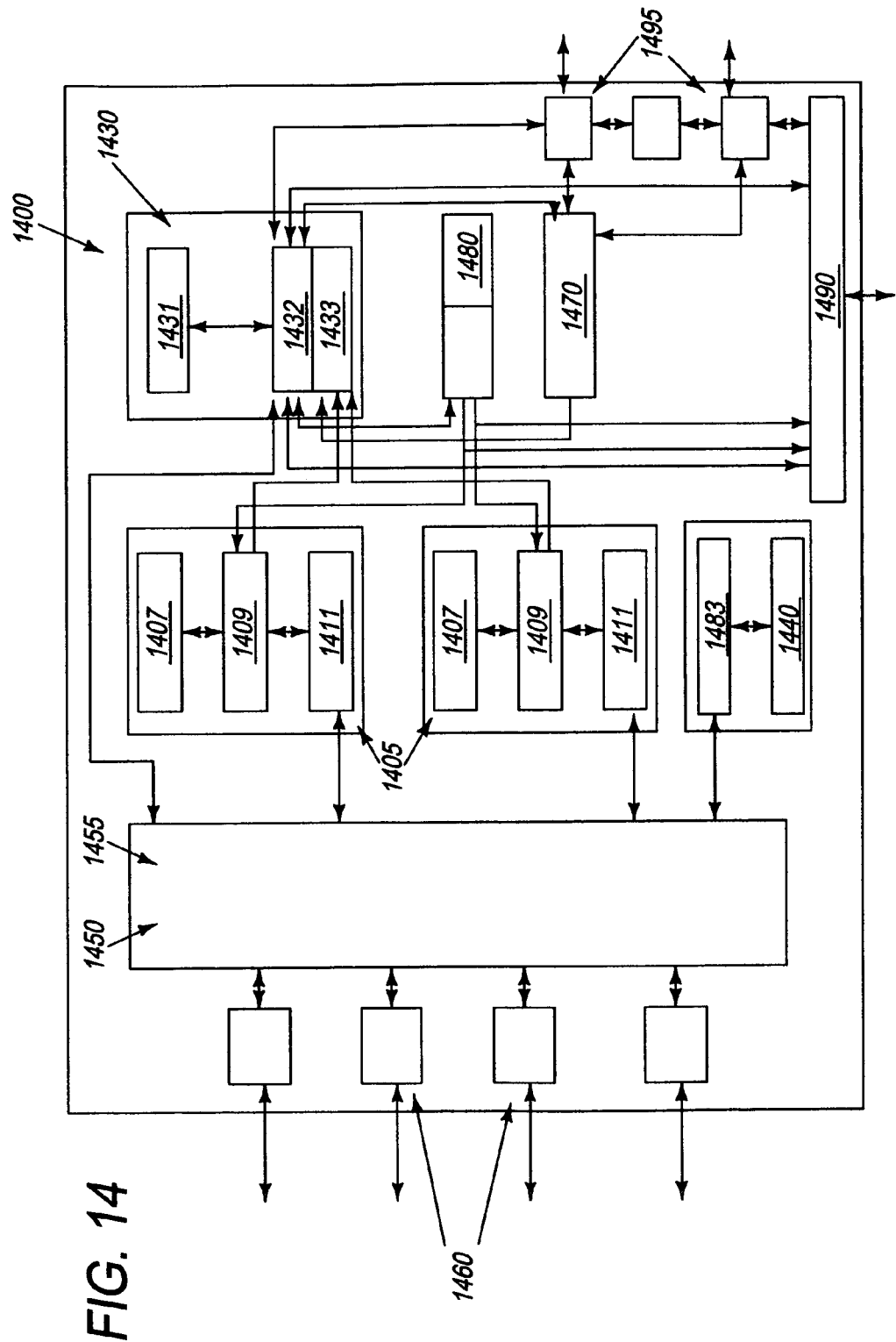
FIG. 14 is a block diagram representation of a preferred embodiment of the packet processor component of the hardware system of the present invention.

Referring now to FIG. 14, an exemplary architecture of the Packet Engine 1400 is provided. In the embodiment depicted, the Packet Engine 1400 is configured to handle data rate up to and around OC-12. It is appreciated by one of ordinary skill in the art that certain modifications can be made to the fundamental architecture to increase the data handling rates beyond OC-12. The Packet Engine 1400 comprises a plurality of processors 1405, a host processor 1430, an ATM engine 1440, in-bound DMA channel 1450, out-bound DMA channel 1455, a plurality of network interfaces 1460, a plurality of registers 1470, memory 1480, an interface to external memory 1490, and a means to receive control and signaling information 1495.

The processors 1405 comprise an internal cache 1407, central processing unit interface 1409, and data memory 1411. In a preferred embodiment, the processors 1405 comprise 32-bit reduced instruction set computing (RISC) processors with a 16 Kb instruction cache and a 12 Kb local memory. The central processing unit interface 1409 permits the processor 1405 to communicate with other memories internal to, and external to, the Packet Engine 1400. The processors 1405 are preferably capable of handling both in-bound and out-bound communication traffic. In a preferred implementation, generally half of the processors handle in-bound traffic while the other half handle out-bound traffic. The memory 1411 in the processor 1405 is preferably divided into a plurality of banks such that distinct elements of the Packet Engine 1400 can access the memory 1411 independently and without contention, thereby increasing overall throughput. In a preferred embodiment, the memory is divided into three banks, such that the in-bound DMA channel can write to memory bank one, while the processor is processing data from memory bank two, while the out-bound DMA channel is transferring processed packets from memory bank three.

The ATM engine 1440 comprises two primary subcomponents, referred to herein as the ATMRx Engine and the ATMTx Engine. The ATMRx Engine processes an incoming ATM cell header and transfers the cell for corresponding AAL protocol, namely AAL1, AAL2, AAL5, processing in the internal memory or to another cell manager, if external to the system. The ATMTx Engine processes outgoing ATM cells and requests the outbound DMA channel to transfer data to a particular interface, such as the UTOPIAII/POSII interface. Preferably, it has separate blocks of local memory for data exchange. The ATM engine 1440 operates in combination with data memory 1483 to map an AAL channel, namely AAL2, to a corresponding channel on the TDM bus (where the Packet Engine 1400 is connected to a Media Engine) or to a corresponding IP channel identifier where internetworking between IP and ATM systems is required. The internal memory 1480 utilizes an independent block to maintain a plurality of tables for comparing and/or relating channel identifiers with virtual path identifiers (VPI), virtual channel identifiers (VC), and compatibility identifiers (CID). A VPI is an eight-bit field in the ATM cell header that indicates the virtual path over which the cell should be routed. A VCI is the address or label of a virtual channel comprised of a unique numerical tag, defined by a 16-bit field in the ATM cell header, which identifies a virtual channel over which a stream of cells is to travel during the course of a session between devices. The plurality of tables are preferably updated by the host processor 1430 and are shared by the ATMRx and ATMTx engines.

The host processor 1430 is preferably a RISC processor with an instruction cache 1431. The host processor 1430 communicates with other hardware blocks through a CPU interface 1432 that is capable of managing communications with Media Engines over a bus, such as a PCI bus, and with a host, such as a signaling host through a PCI-PCI bridge. The host processor 1430 is capable of being interrupted by other processors 1405 through their transmission of interrupts which are handled by an interrupt handler 1433 in the CPU interface. It is further preferred that the host processor 1430 be capable of performing the following functions: 1) boot-up processing, including loading code from a flash memory to an external memory and starting execution, initializing interfaces and internal registers, acting as a PCI host, and appropriately configuring them, and setting up inter-processor communications between a signaling host, the packet engine itself, and media engines, 2) DMA configuration, 3) certain network management functions, 4) handling exceptions, such as the resolution of unknown addresses, fragmented packets, or packets with invalid headers, 4) providing intermediate storage of tables during system shutdown, 5) IP stack implementation, and 6) providing a message-based interface for users external to the packet engine and for communicating with the packet engine through the control and signaling means, among others.

In a preferred embodiment, two DMA channels are provided for data exchange between different memory blocks via data buses. Referring to FIG. 14, the in-bound DMA channel 1450 is utilized to handle incoming traffic to the Packet Engine 1400 data processing elements and the out-bound DMA channel 1455 is utilized to handle outgoing traffic to the plurality of network interfaces 1460. The in-bound DMA channel 1450 handles all of the data coming into the Packet Engine 1400.

Figure 15:
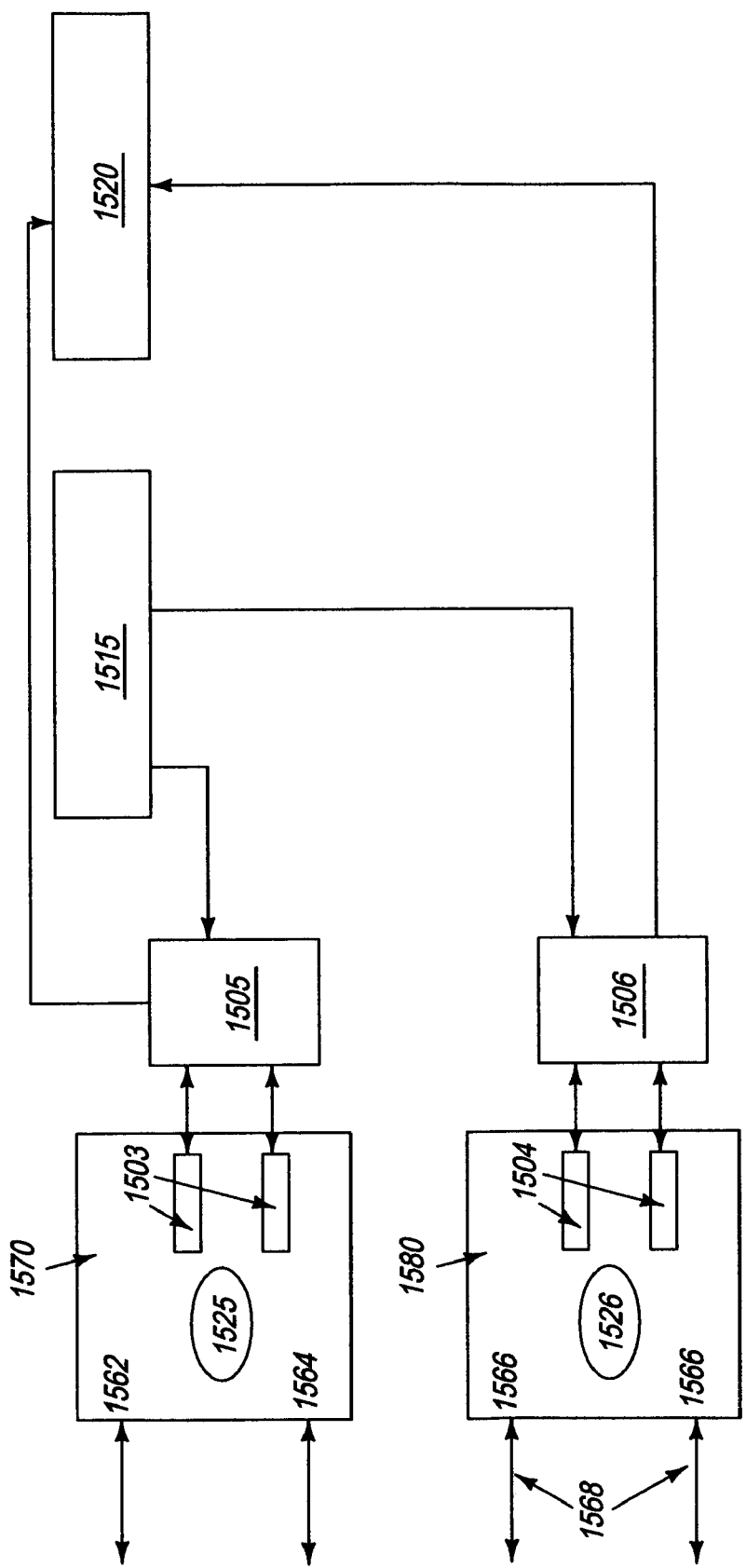
FIG. 15 is a schematic representation of one embodiment of the plurality of network interfaces in the packet processor component of the hardware system of the present invention.

To receive and transmit data to ATM and IP networks, the Packet Engine 1400 has a plurality of network interfaces 1460 that permit the Packet Engine to compatibly communicate over networks. Referring to FIG. 15, in a preferred embodiment, the network interfaces comprise a GMII PHY interface 1562, a GMII MAC interface 1564, and two UTOPIAII/POSII interfaces 1566 in communication with 622 Mbps ATM/SONET connections 1568 to receive and transmit data.

For IP-based traffic, the Packet Engine [not shown] supports MAC and emulates PHY layers of the Ethernet interface as specified in IEEE 802.3. The gigabit Ethernet MAC 1570 comprises FIFOs 1503 and a control state machine 1525. The transmit and receive FIFOs 1503 are provided for data exchange between the gigabit Ethernet MAC 1570 and bus channel interface 1505. The bus channel interface 1505 is in communication with the outbound DMA channel 1515 and in-bound DMA channel 1520 through bus channel. When IP data is being received from the GMII MAC interface 1564, the MAC 1570 preferably sends a request to the DMA 1520 for data movement. Upon receiving the request, the DMA 1520 preferably checks the task queue [not shown] in the MAC interface 1564 and transfers the queued packets. In a preferred embodiment, the task queue in the MAC interface is a set of 64 bit registers containing a data structure comprising: length of data, source address, and destination address. Where the DMA 1520 is maintaining the write pointers for the plurality of destinations [not shown], the destination address will not be used. The DMA 1520 will move the data over the bus channel to memories located within the processors and will write the number of tasks at a predefined memory location. After completing writing of all tasks, the DMA 1520 will write the total number of tasks transferred to the memory page. The processor will process the received data and will write a task queue for an outbound channel of the DMA. The outbound DMA channel 1515 will check the number of frames present in the memory locations and, after reading the task queue, will move the data either to a POSII interface of the Media Engine Type I or II or to an external memory location where IP to ATM bridging is being performed.

For ATM only or ATM and IP traffic in combination, the Packet Engine supports two configurable UTOPII/POSII interfaces 1566 which provides an interface between the PHY and upper layer for IP/ATM traffic. The UTOPII/POSII 1580 comprises FIFOs 1504 and a control state machine 1526. The transmit and receive FIFOs 1504 are provided for data exchange between the UTOPII/POSII 1580 and bus channel interface 1506. The bus channel interface 1506 is in communication with the outbound DMA channel 1515 and in-bound DMA channel 1520 through bus channel. The UTOPIA II/POS II interfaces 1566 may be configured in either UTOPIA level II or POS level II modes. When data is received on the UTOPII/POSII interface 1566, data will push existing tasks in the task queue forward and request the DMA 1520 to move the data. The DMA 1520 will read the task queue from the UTOPII/POSII interface 1566 which contains a data structure comprising: length of data, source address, and type of interface. Depending upon the type of interface, e.g. either POS or UTOPIA, the in-bound DMA channel 1520 will send the data either to the plurality of processors [not shown] or to the ATMRx engine [not shown]. After data is written into the ATMRx memory, it is processed by the ATM engine and passed to the corresponding AAL layer. On the transmit side, data is moved to the internal memory of the ATMTx engine [not shown] by the respective AAL layer. The ATMTx engine inserts the desired ATM header at the beginning of the cell and will request the outbound DMA channel 1515 to move the data to the UTOPIAII/POSII interface 1566 having a task queue with the following data structure: length of data and source address.

Figure 16:
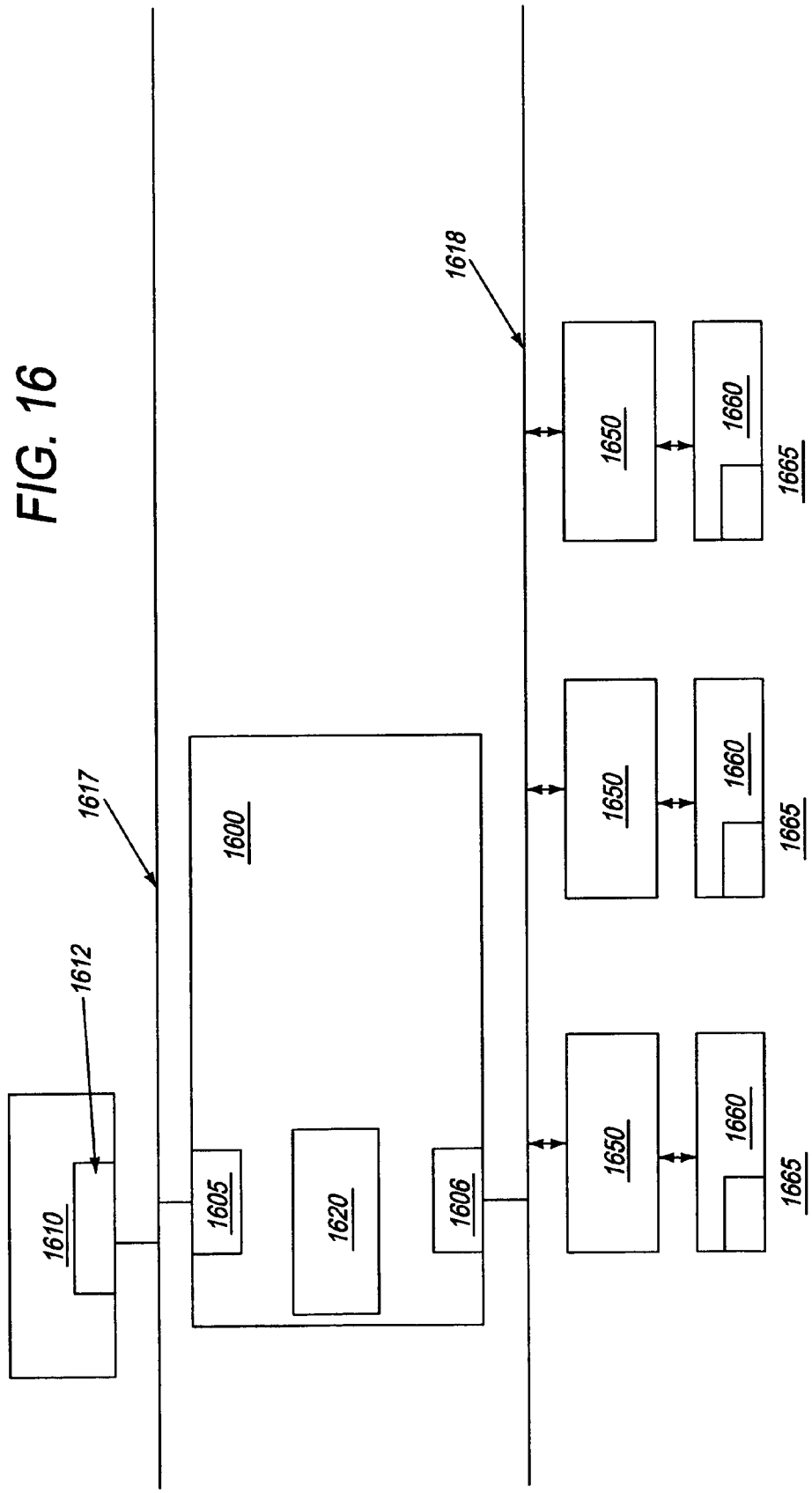
FIG. 16 is a block diagram of a plurality of PCI interfaces used to facilitate control and signaling functions for the packet processor component of the hardware system of the present invention.

Referring to FIG. 16, to facilitate control and signaling functions, the Packet Engine 1600 has a plurality of PCI interfaces 1605, 1606, referred to in FIG. 14 as 1495. In a preferred embodiment, a signaling host 1610, through an initiator 1612, sends messages to be received by the Packet Engine 1600 to a PCI target 1605 via a communication bus 1617. The PCI target further communicates these messages through a PCI to PCI bridge 1620 to a PCI initiator 1606. The PCI initiator 1606 sends messages through a communication bus 1618 to a plurality of Media Engines 1650, each having a memory 1660 with a memory queue 1665.

Software Architecture

As previously discussed, operating on the above-described hardware architecture embodiments is a plurality of novel, integrated software systems designed to enable media processing, signaling, and packet processing. The novel software architecture enables the logical system, presented in FIG. 5, to be physically deployed in a number of ways, depending on processing needs.

Communication between any two modules, or components, in the software system is facilitated by application program interfaces (APIs) that remain substantially constant and consistent irrespective of whether the software components reside on a hardware element or across multiple hardware elements. This permits the mapping of components onto different processing elements, thereby modifying physical interfaces, without the concurrent modification of the individual components.

Figure 17:
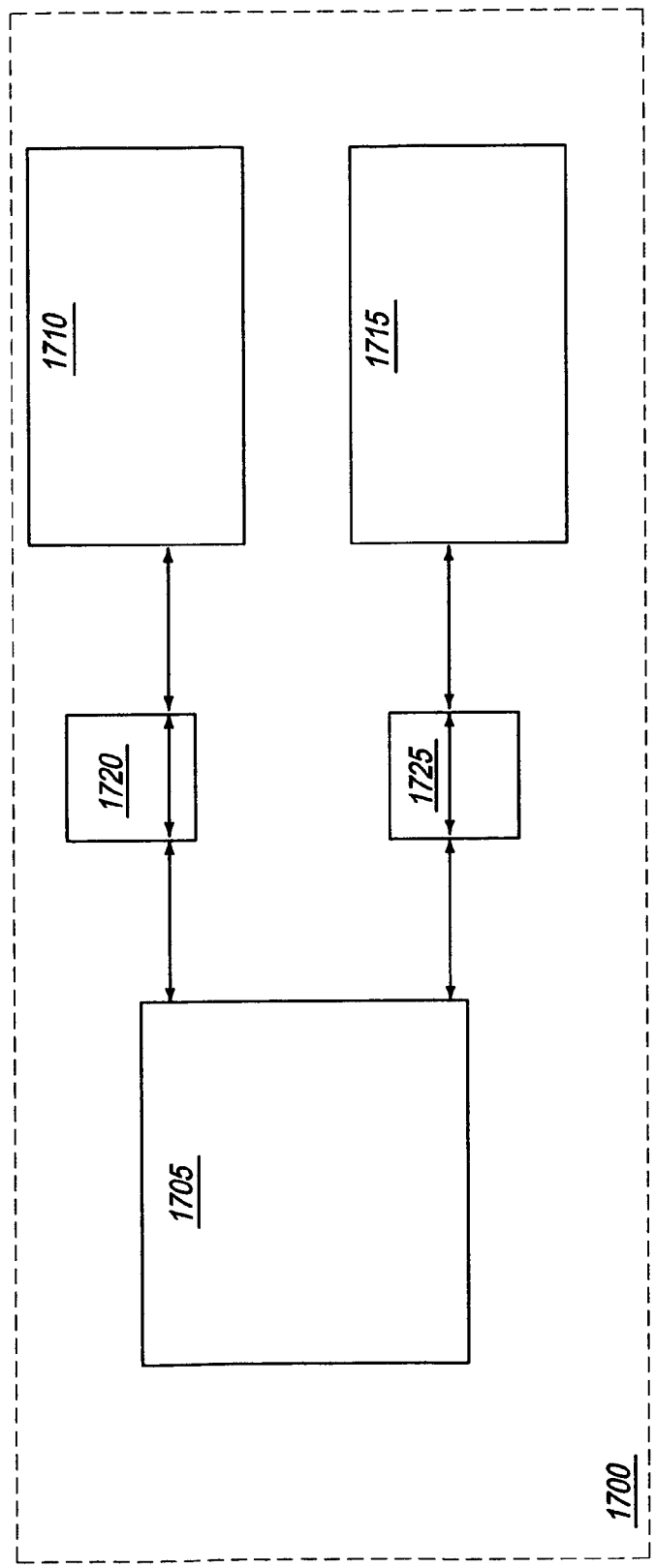
FIG. 17 is a first exemplary flow diagram of data communicated between components of the software system of the present invention.
Figure 17A:
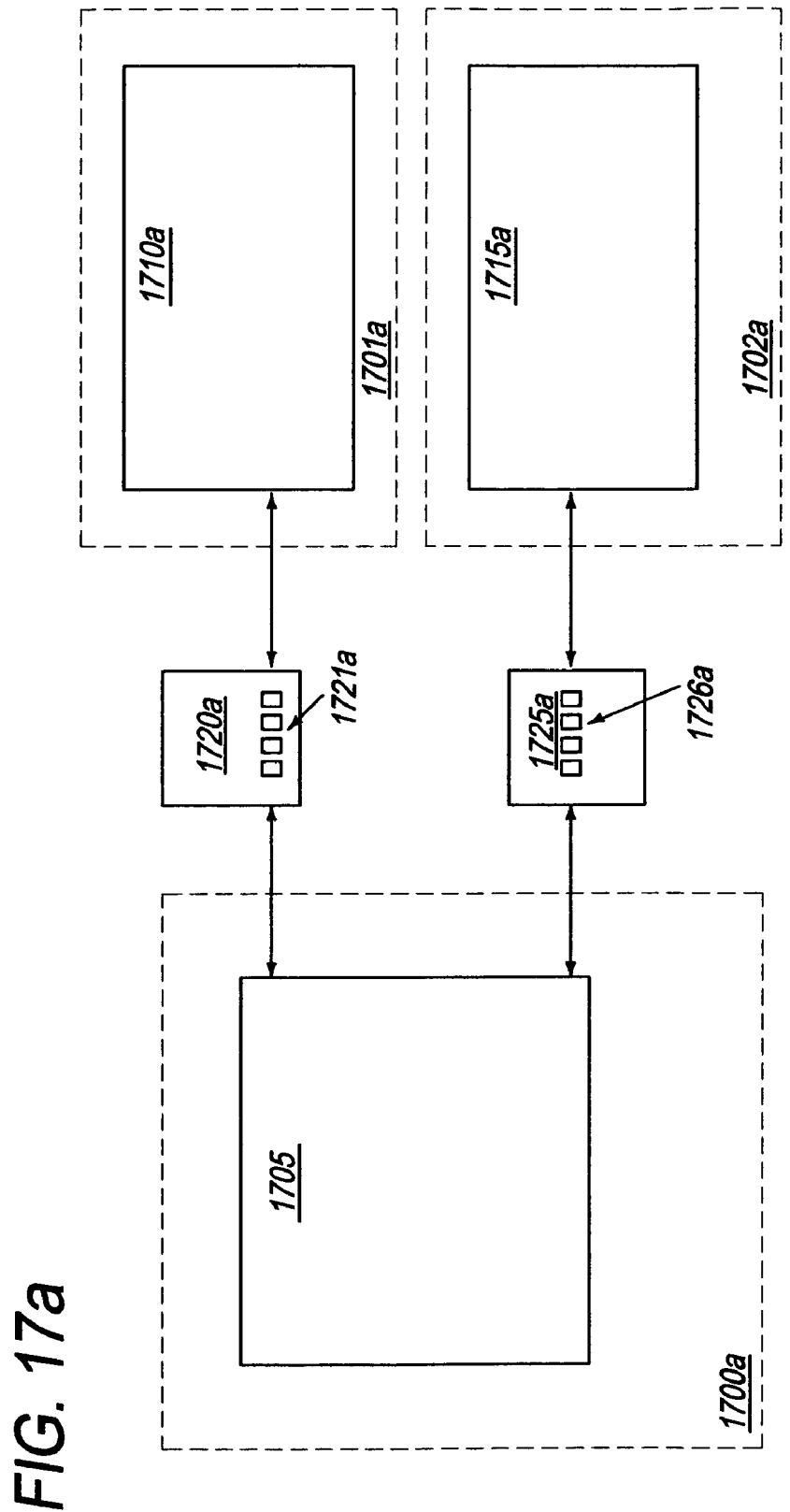
FIG. 17a is a second exemplary flow diagram of data communicated between components of the software system of the present invention.

In an exemplary embodiment, shown in FIG. 17, a first component 1705 operates in conjunction with a second component 1710 and a third component 1715 through a first interface 1720 and second interface 1725, respectively. Because all three components 1705, 1710, 1715 are executing on the same physical processor 1700, the first interface 1720 and second interface 1725 perform interfacing tasks through function mapping conducted via the APIs of each of the three components 1705, 1710, 1715. Referring to FIG. 17a, where the first 1705a, second 1710a, and third 1715a components reside on separate hardware elements 1700a, 1701a, 1702a, respectively, e.g., separate processors or processing elements, the first interface 1720a and second interface 1725a implement interfacing tasks through queues 1721a, 1726a in shared memory. While the interfaces 1720a, 1725a are no longer limited to function mapping and messaging, the components 1705a, 1710a, 1715a continue to use the same APIs to conduct inter-component communication. The consistent use of a standard API enables the porting of various components to different hardware architectures in a distributed processing environment by relying on modified interfaces or drivers where necessary and without modifications in the components themselves.

Figure 18:
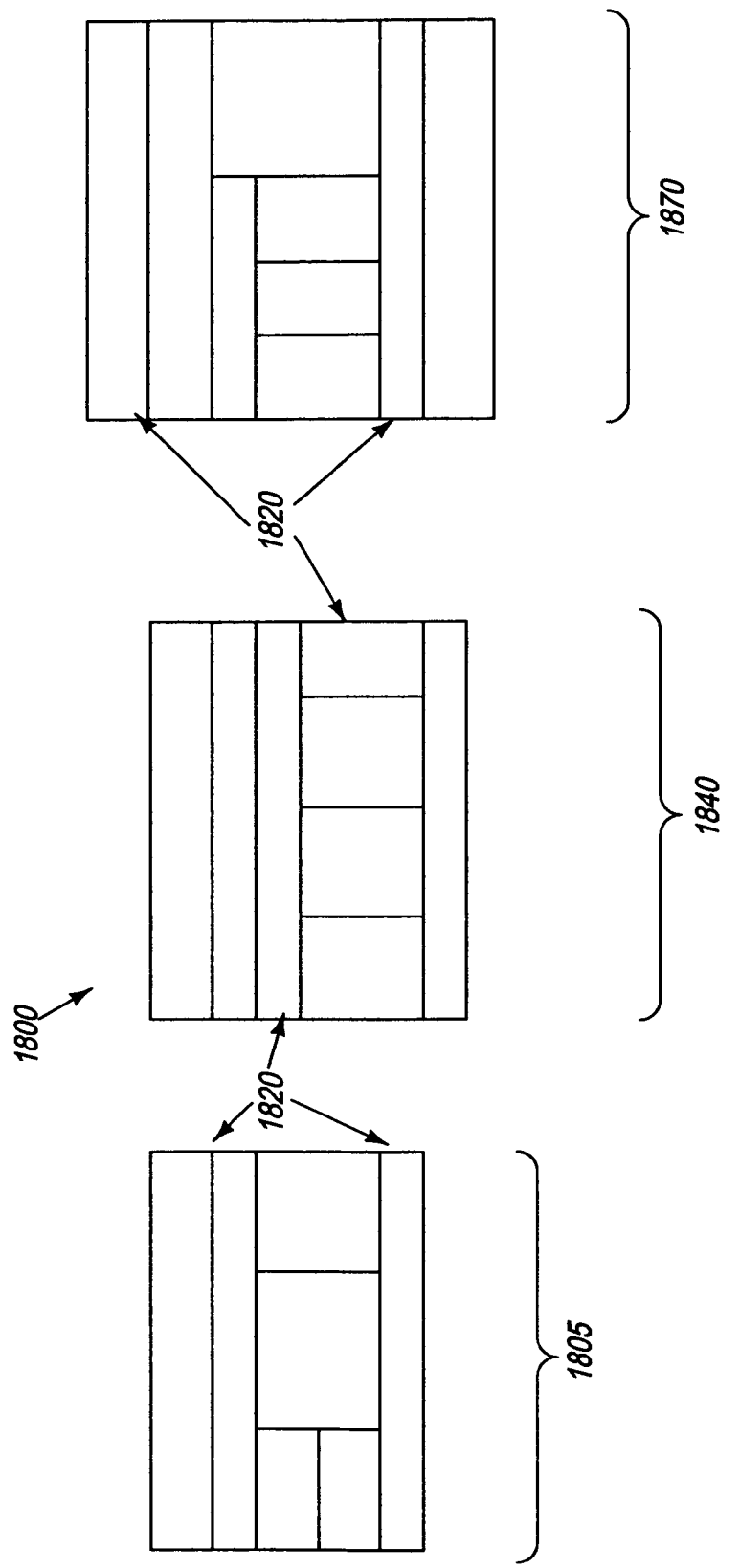
FIG. 18 is a schematic diagram of logical division of the software system of the present invention.

Referring now to FIG. 18, a logical division of the software system 1800 is shown. The software system 1800 is divided into three subsystems, a Media Processing Subsystem 1805, a Packetization Subsystem 1840, and a Signaling/Management Subsystem (hereinafter referred to as the Signaling Subsystem) 1870. The Media Processing Subsystem 1805 sends encoded data to the Packetization Subsystem 1840 for encapsulation and transmission over the network and receives network data from the Packetization Subsystem 1840 to be decoded and played out. The Signaling Subsystem 1870 communicates with the Packetization Subsystem 1840 to get status information such as the number of packets transferred, to monitor the quality of service, control the mode of particular channels, among other functions. The Signaling Subsystem 1870 also communicates with the Packetization Subsystem 1840 to control establishment and destruction of packetization sessions for the origination and termination of calls. Each subsystem 1805, 1840, and 1870 further comprises a series of components 1820 designed to perform different tasks in order to effectuate the processing and transmission of media. Each of the components 1820 conducts communications with any other module, subsystem, or system through APIs that remain substantially constant and consistent irrespective of whether the components reside on a hardware element or across multiple hardware elements, as previously discussed.

Figures 19, 20, 21:
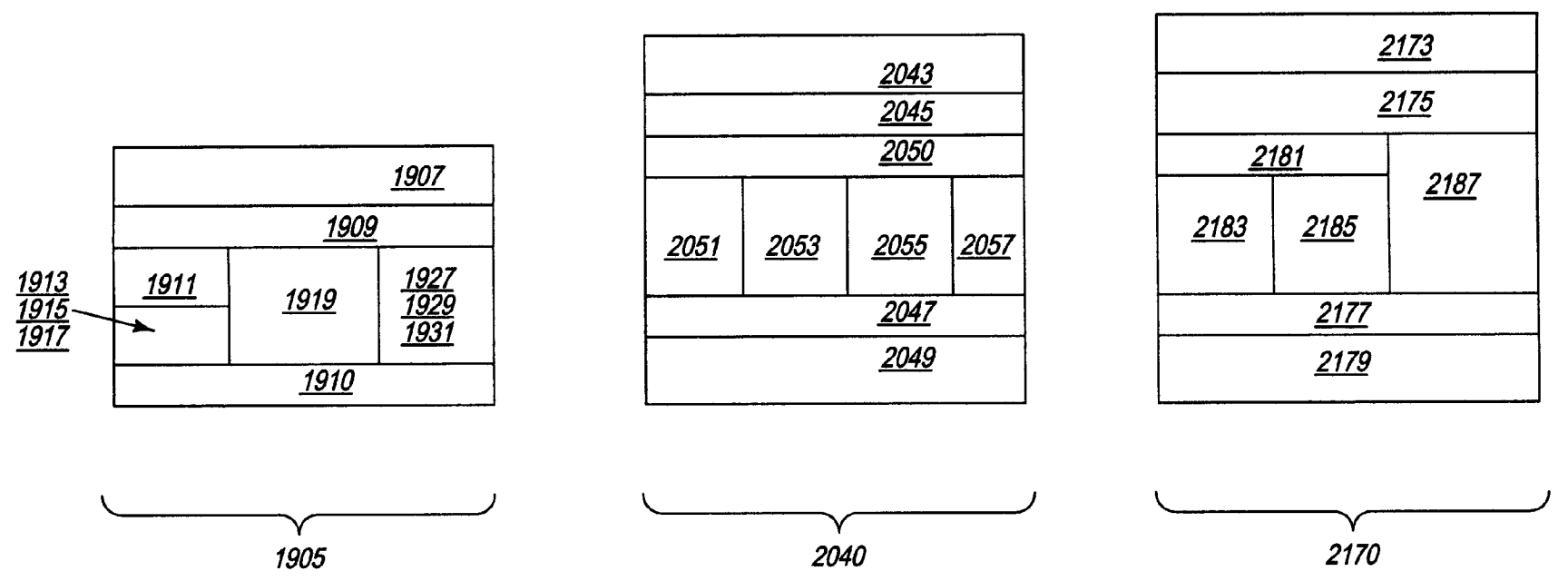

In an exemplary embodiment, shown in FIG. 19, the Media Processing Subsystem 1905 comprises a system API component 1907, media API component 1909, real-time media kernel 1910, and voice processing components, including line echo cancellation component 1911, components dedicated to performing voice activity detection 1913, comfort noise generation 1915, and discontinuous transmission management 1917, a component 1919 dedicated to handling tone signaling functions, such as dual tone (DTMF/MF), call progress, call waiting, and caller identification, and components for media encoding and decoding functions for voice 1927, fax 1929, and other data 1931.

The system API component 1907 should be capable of providing a system wide management and enabling the cohesive interaction of individual components, including establishing communications between external applications and individual components, managing run-time component addition and removal, downloading code from central servers, and accessing the MIBs of components upon request from other components. The media API component 1909 interacts with the real time media kernel 1910 and individual voice processing components. The real time media kernel 1910 allocates media processing resources, monitors resource utilization on each media-processing element, and performs load balancing to substantially maximize density and efficiency.

The voice processing components can be distributed across multiple processing elements. The line echo cancellation component 1911 deploys adaptive filter algorithms to remove from a signal echoes that may arise as a result of the reflection and/or retransmission of modified input signals back to the originator of the input signals. In one preferred embodiment, the line echo cancellation component 1911 has been programmed to implement the following filtration approach: An adaptive finite impulse response (FIR) filter of length N is converged using a convergence process, such as a least means square approach. The adaptive filter generates a filtered output by obtaining individual samples of the far-end signal on a receive path, convolving the samples with the calculated filter coefficients, and then subtracting, at the appropriate time, the resulting echo estimate from the received signal on the transmit channel. With convergence complete, the filter is then converted to an infinite impulse response (IIR) filter using a generalization of the ARMA-Levinson approach. In the course of operation, data is received from an input source and used to adapt the zeroes of the IIR filter using the LMS approach, keeping the poles fixed. The adaptation process generates a set of converged filter coefficients that are then continually applied to the input signal to create a modified signal used to filter the data. The error between the modified signal and actual signal received is monitored and used to further adapt the zeroes of the IIR filter. If the measured error is greater than a predetermined threshold, convergence is re-initiated by reverting back to the FIR convergence step.

The voice activity detection component 1913 receives incoming data and determines whether voice or another type of signal, i.e., noise, is present in the received data, based upon an analysis of certain data parameters. The comfort noise generation component 1915 operates to send a Silence Insertion Descriptor (SID) containing information that enables a decoder to generate noise corresponding to the background noise received from the transmission. An overlay of audible but non-obtrusive noise has been found to be valuable in helping users discern whether a connection is live or dead. The SID frame is typically small, i.e. approximately 15 bits under the G.729 B codec specification. Preferably, updated SID frames are sent to the decoder whenever there has been sufficient change in the background noise.

The tone signaling component 1919, including recognition of DTMF/MF, call progress, call waiting, and caller identification, operates to intercept tones meant to signal a particular activity or event, such as the conducting of two-stage dialing (in the case of DTMF tones), the retrieval of voice-mail, and the reception of an incoming call (in the case of call waiting), and communicate the nature of that activity or event in an intelligent manner to a receiving device, thereby avoiding the encoding of that tone signal as another element in a voice stream. In one embodiment, the tone-signaling component 1919 is capable of recognizing a plurality of tones and, therefore, when one tone is received, send a plurality of RTP packets that identify the tone, together with other indicators, such as length of the tone. By carrying the occurrence of an identified tone, the RTP packets convey the event associated with the tone to a receiving unit. In a second embodiment, the tone-signaling component 1919 is capable of generating a dynamic RTP profile wherein the RTP profile carries information detailing the nature of the tone, such as the frequency, volume, and duration. By carrying the nature of the tone, the RTP packets convey the tone to the receiving unit and permit the receiving unit to interpret the tone and, consequently, the event or activity associated with it.

Components for the media encoding and decoding functions for voice 1927, fax 1929, and other data 1931, referred to as codecs, are devised in accordance with International Telecommunications Union (ITU) standard specifications, such as G.711 for the encoding and decoding of voice, fax, and other data. An exemplary codec for voice, data, and fax communications is ITU standard G.711, often referred to as pulse code modulation. G.711 is a waveform codec with a sampling rate of 8,000 Hz. Under uniform quantization, signal levels would typically require at least 12 bits per sample, resulting in a bit rate of 96 kbps. Under non-uniform quantization, as is commonly used, signal levels require approximately 8 bits per sample, leading to a 64 kbps rate. Other voice codecs include ITU standards G.723.1, G.726, and G.729 A/B/E, all of which would be known and appreciated by one of ordinary skill in the art. Other ITU standards supported by the fax media processing component 1929 preferably include T.38 and standards falling within V.xx, such as V.17, V.90, and V.34. Exemplary codecs for fax include ITU standard T.4 and T.30. T.4 addresses the formatting of fax images and their transmission from sender to receiver by specifying how the fax machine scans documents, the coding of scanned lines, the modulation scheme used, and the transmission scheme used. Other codecs include ITU standards T.38.

Referring to FIG. 20, in an exemplary embodiment, the Packetization Subsystem 2040 comprises a system API component 2043, packetization API component 2045, POSIX API 2047, real-time operating system (RTOS) 2049, components dedicated to performing such quality of service functions as buffering and traffic management 2050, a component for enabling IP communications 2051, a component for enabling ATM communications 2053, a component for resource-reservation protocol (RSVP) 2055, and a component for multi-protocol label switching (MPLS) 2057. The Packetization Subsystem 2040 facilitates the encapsulation of encoded voice/data into packets for transmission over ATM and IP networks, manages certain quality of service elements, including packet delay, packet loss, and jitter management, and implements traffic shaping to control network traffic. The packetization API component 2045 provides external applications facilitated access to the Packetization Subsystem 2040 by communicating with the Media Processing Subsystem [not shown] and Signaling Subsystem [not shown].

The POSIX API 2047 layer isolated the operating system (OS) from the components and provides the components with a consistent OS API, thereby insuring that components above this layer do not have to be modified if the software is ported to another OS platform. The RTOS 2049 acts as the OS facilitating the implementation of software code into hardware instructions.

The IP communications component 2051 supports packetization for TCP/IP, UDP/IP, and RTP/RTCP protocols. The ATM communications component 2053 supports packetization for AAL1, AAL2, and AAL5 protocols. It is preferred that the RTP/UDP/IP stack be implemented on the RISC processors of the Packet Engine. A portion of the ATM stack is also preferably implemented on the RISC processors with more computationally intensive parts of the ATM stack implemented on the ATM engine.

The component for RSVP 2055 specifies resource-reservation techniques for IP networks. The RSVP protocol enables resources to be reserved for a certain session (or a plurality of sessions) prior to any attempt to exchange media between the participants. Two levels of service are generally enabled, including a guaranteed level that emulates the quality achieved in conventional circuit switched networks, and controlled load that is substantially equal to the level of service achieved in a network under best-effort and no-load conditions. In operation, a sending unit issues a PATH message to a receiving unit via a plurality of routers. The PATH message contains a tragic specification (Tspec) that provides details about the data that the sender expects to send, including bandwidth requirement and packet size. Each RSVP-enabled router along the transmission path establishes a path state that includes the previous source address of the PATH message (the prior router). The receiving unit responds with a reservation request (RESV) that includes a flow specification having the Tspec and information regarding the type of reservation service requested, such as controlled-load or guaranteed service. The RESV message travels back, in reverse fashion, to the sending unit along the same router pathway. At each router, the requested resources are allocated, provided such resources are available and the receiver has authority to make the request. The RESV eventually reaches the sending unit with a confirmation that the requisite resources have been reserved.

The component for MPLS 2057 operates to mark traffic at the entrance to a network for the purpose of determining the next router in the path from source to destination. More specifically, the MPLS 2057 component attaches a label containing all of the information a router needs to forward a packet to the packet in front of the IP header. The value of the label is used to look up the next hop in the path and the basis for the forwarding of the packet to the next router. Conventional IP routing operates similarly, except the MPLS process searches for an exact match, not the longest match as in conventional IP routing.

Referring to FIG. 21, in an exemplary embodiment, the Signaling Subsystem 2170 comprises a user application API component 2173, system API component 2175, POSIX API 2177, real-time operating system (RTOS) 2179, a signaling API 2181, components dedicated to performing such signaling functions as signaling stacks for ATM networks 2183 and signaling stacks for IP networks 2185, and a network management component 2187. The signaling API 2181 provides facilitated access to the signaling stacks for ATM networks 2183 and signaling stacks for IP networks 2185. The signaling API 2181 comprises a master gateway and sub-gateways of N number. A single master gateway can have N subgateways associated with it. The master gateway performs the demultiplexing of incoming calls arriving from an ATM or IP network and routes the calls to the sub-gateway that has resources available. The sub-gateways maintain the state machines for all active terminations. The sub-gateways can be replicated to handle many terminations. Using this design, the master gateway and sub-gateways can reside on a single processor or across multiple processors, thereby enabling the simultaneous processing of signaling for a large number of terminations and the provision of substantial scalability.

The user application API component 2173 provides a way for external applications to interface with the entire software system, comprising each of the Media Processing Subsystem, Packetization Subsystem, and Signaling Subsystem. The network management component 2187 supports local and remote configuration and network management through the support of simple network management protocol (SNMP). The configuration portion of the network management component 2187 is capable of communicating with any of the other components to conduct configuration and network management tasks and can route remote requests for tasks, such as the addition or removal of specific components.

The signaling stacks for ATM networks 2183 include support for User Network Interface (UNI) for the communication of data using AAL1, AAL2, and AAL5 protocols. User Network Interface comprises specifications for the procedures and protocols between the gateway system, comprising the software system and hardware system, and an ATM network. The signaling stacks for IP networks 2185 include support for a plurality of accepted standards, including media gateway control protocol (MGCP), H.323, session initiation protocol (SIP), H.248, and network-based call signaling (NCS). MGCP specifies a protocol converter, the components of which may be distributed across multiple distinct devices. MGCP enables external control and management of data communications equipment, such as media gateways, operating at the edge of multi-service packet networks. H.323 standards define a set of call control, channel set up, and codec specifications for transmitting real time voice and video over networks that do not necessarily provide a guaranteed level of service, such as packet networks. SIP is an application layer protocol for the establishment, modification, and termination of conferencing and telephony sessions over an IP-based network and has the capability of negotiating features and capabilities of the session at the time the session is established. H.248 provides recommendations underlying the implementation of MGCP.

Figure 23:
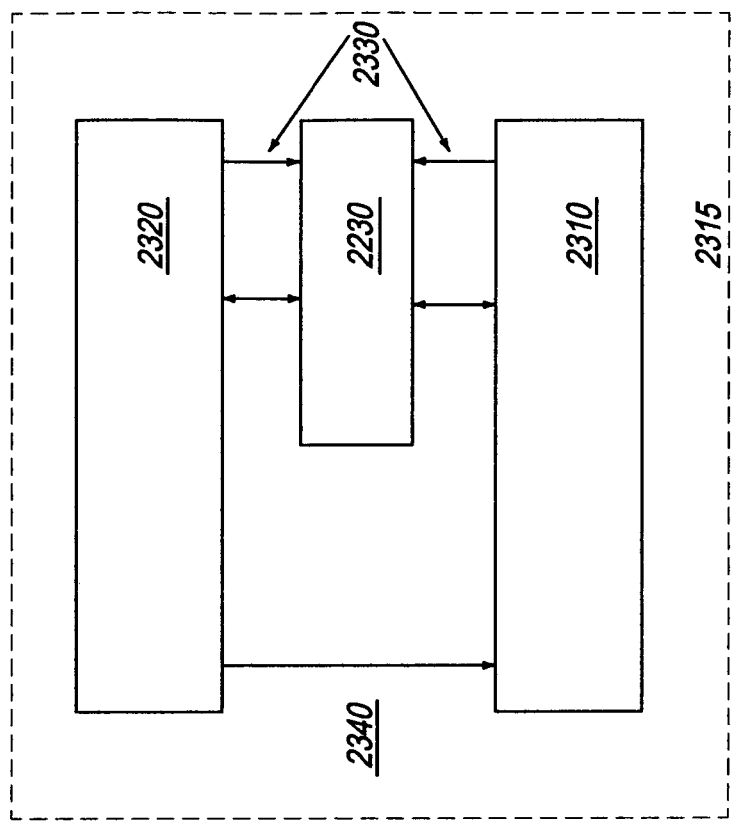
FIG. 23 is a block diagram of a host application operative on a virtual DSP.
Figure 22:
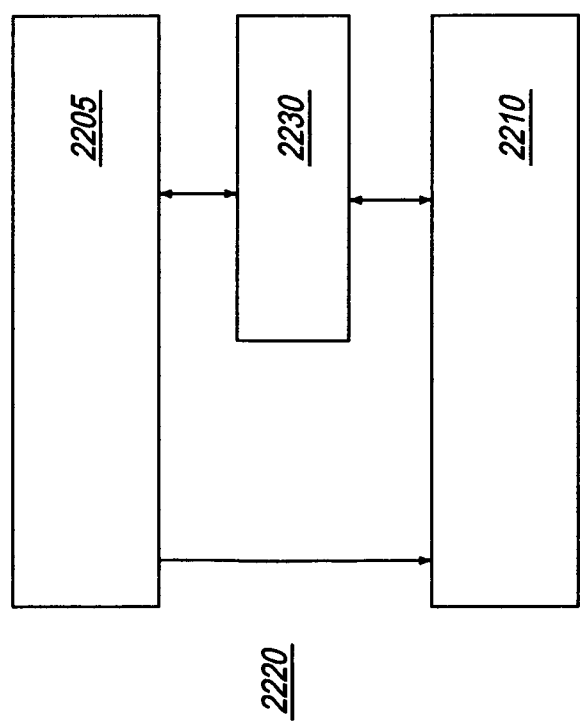
FIG. 22 is a block diagram of a host application operative on a physical DSP.

To further enable ease of scalability and implementation, the present software method and system does not require specific knowledge of the processing hardware being utilized. Referring to FIG. 22, in a typical embodiment, a host application 2205 interacts with a DSP 2210 via an interrupt capability 2220 and shared memory 2230. As shown in FIG. 23, the same functionality can be achieved by a simulation execution through the operation of a virtual DSP program 2310 as a separate independent thread on the same processor 2315 as the application code 2320. This simulation run is enabled by a task queue mutex 2330 and a condition variable 2340. The task queue mutex 2330 protects the data shared between the virtual DSP program 2310 and a resource manager [not shown]. The condition variable 2340 allows the application to synchronize with the virtual DSP 2310 in a manner similar to the function of the interrupt 2220 in FIG. 22.

The present methods and systems provide for a system on chip architecture having scalable, distributed processing and memory capabilities through a plurality of processing layers and the application of that chip architecture in a media gateway that is designed to enable the communication of media across circuit switched and packet switched networks. While various embodiments of the present invention have been shown and described, it would be apparent to those skilled in the art that many modifications are possible without departing from the inventive concept disclosed herein For example, it would be apparent that the system chip architecture can be used to process other forms of data and for purposes other than telecommunications. It would further be apparent that, depending on the functionality desired, the PUs could be designed to perform application specific tasks other than line echo cancellation or encoding or decoding.

What is claimed is:

1. A media processor for the processing of media based upon instructions, comprising: a single chip comprising a) a first processing layer wherein said first processing layer has at least two processing units, at least one program memory, and at least one data memory, each of said processing units, program memory, and data memory being in communication with one another, b) a second processing layer wherein said second processing layer operates in parallel to said first processing layer and has at least two processing units, at least one program memory, and at least one data memory, each of said processing units, program memory, and data memory being in communication with one another, wherein at least one of said two processing units in each of said first and second processing layers performs line echo cancellation functions on received data and wherein at least one of said two processing units in each of said first and second processing layers performs encoding or decoding functions on received data; and e) a task scheduler adapted to receive a plurality of tasks from a source and distributing said tasks to each of said first and second processing layers for execution in a parallel, pipelined manner.

2. The media processor of claim 1, wherein the single chip further comprises a direct memory access controller for handling data transfers, each of said transfers having a size and a direction, from at least one data memory having an address and a plurality of external memory units, each having an address.

3. The media processor of claim 2, wherein said transfers between at least one data memory and at least one external memory occur by utilizing the address of the data memory, the address of the external memory, the size of the transfer, and the direction of the transfer.

4. The media processor of claim 1, wherein the task scheduler is in communication with an external memory.

5. The media processor of claim 1, wherein the single chip further comprises an interface for the receipt and transmission of data and control signals.

6. The media processor of claim 5, wherein the interface comprises a UTOPIA-compatible interface.

7. The media processor of claim 5, wherein the interface comprises a time division multiplex-compatible interface.

8. The media processor of claim 1, wherein the processing unit designed to perform encoding or decoding functions comprises an arithmetic and logic unit, multiply and accumulate unit, barrel shifter, and normalization unit.

9. The media processor of claim 1, wherein each of said first and second processing layers comprise a third processing unit wherein said third processing unit performs voice activity detection and tone signaling functions.

10. The media processor of claim 9, wherein the third processing unit comprises a plurality of single-cycle multiply and accumulate units operating with an address generation unit and an instruction decoder.

* * * * *